(12) United States Patent
Lee

(10) Patent No.: US 9,921,780 B2
(45) Date of Patent: Mar. 20, 2018

(54) MEMORY SYSTEM AND OPERATING METHOD THEREOF

(71) Applicant: SK hynix Inc., Gyeonggi-do (KR)

(72) Inventor: Jong-Min Lee, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 58 days.

(21) Appl. No.: 15/144,451

(22) Filed: May 2, 2016

(65) Prior Publication Data

US 2017/0147259 A1   May 25, 2017

(30) Foreign Application Priority Data

Nov. 23, 2015   (KR) .................. 10-2015-0163765

(51) Int. Cl.
  *G06F 3/06*     (2006.01)
  *G06F 12/1009*  (2016.01)
  *G06F 12/02*    (2006.01)

(52) U.S. Cl.
  CPC .......... *G06F 3/0659* (2013.01); *G06F 3/0604* (2013.01); *G06F 3/0673* (2013.01); *G06F 12/0292* (2013.01); *G06F 12/1009* (2013.01); *G06F 2212/65* (2013.01); *G06F 2212/657* (2013.01)

(58) Field of Classification Search
  CPC ... G06F 12/10; G06F 12/0292; G06F 12/0246
  See application file for complete search history.

(56) References Cited

U.S. PATENT DOCUMENTS 6,377,500 B1 *  4/2002  Fujimoto ............ G06F 12/0246
                                                365/230.01

FOREIGN PATENT DOCUMENTS

| KR | 1020120011634 | 2/2012 |
| KR | 101154708     | 6/2012 |
| KR | 1020140048186 | 4/2014 |
| KR | 101414453     | 7/2014 |

* cited by examiner

*Primary Examiner* — Edward J Dudek, Jr.
(74) *Attorney, Agent, or Firm* — IP & T Group LLP

(57) ABSTRACT

A memory system may include a memory device including a plurality of memory blocks each memory block including a plurality of pages, and a controller suitable for storing data in a first memory block of the memory blocks, generating map data for the stored data in the first memory block by sorting map segments of the map data based on logical information of the data, and storing the map data in a second memory block of the memory blocks.

16 Claims, 14 Drawing Sheets

MEMORY SYSTEM AND OPERATING METHOD THEREOF

CROSS-REFERENCE TO RELATED APPLICATIONS

The present application claims priority of Korean Patent Application No. 10-2015-0163765, filed on Nov. 23, 2015, the disclosures of which are incorporated herein in their entirety by reference.

BACKGROUND

1. Field

Exemplary embodiments relate to a memory system, and more particularly, to a memory system that processes data to a memory device and an operating method thereof.

2. Description of the Related Art

The computer environment paradigm has shifted to ubiquitous computing systems that can be used anytime and anywhere. As a result, use of portable electronic devices, such as mobile phones, digital cameras, and notebook computers continues to increase rapidly. These portable electronic devices generally use a memory system having one or more semiconductor memory devices for storing data. The semiconductor memory devices also referred to as data storage devices may be used as the main memory device or an auxiliary memory device of a portable electronic device.

Semiconductor memory devices provide excellent stability, durability, high information access speed, and low power consumption, since unlike other type of storage devices they have no moving parts. Examples of semiconductor memory devices having such advantages include universal serial bus (USB) memory devices, memory cards having various interfaces, and solid state drives (SSD).

SUMMARY

Various embodiments of the present disclosure are directed to a memory system and an operating method thereof capable of minimizing performance deterioration due to use by simplifying its operation and more quickly and stably processing data to a memory device.

In an embodiment, a memory system may include a memory device including a plurality of memory blocks each memory block including a plurality of pages; and a controller suitable for storing data in a first memory block of the memory blocks, generating map data for the stored data in the first memory block by sorting map segments of the map data based on logical information of the data, and storing the map data in a second memory block of the memory blocks.

The controller may load the map data from the second memory block to a memory of the controller, and may scan the sorted map segments of the map data for a first map segment of first data corresponding to a command received from a host.

The controller may confirm a position of the first map segment through the scanning based on logical information of the first data in the sorted map segments of the map data, and may shift a second map segment existing in the confirmed position, thereby generating an empty area in the map data.

The controller may store the first data in the first memory block, and may record the first map segment corresponding to storage of the first data to the first memory block in the empty area, thereby updating the map data.

The controller may store the updated map data in the memory and the second memory block.

The controller may confirm the first map segment through the scanning based on logical information of the first data in the sorted map segments of the map data, may read the first data stored in the first memory block through the first map segment confirmed in the map data, and may provide the read first data to the host.

The controller may sort indexes indicating the storage of the data to the first memory block based on the logical information of the data in a map list for the map segments, and may store the sorted indexes in a memory of the controller.

The logical information of the data may include a logical page number (LPN) of the data stored in the first memory block.

The map segments may include physical to logical (P2L) segments for the data in correspondence to the storage of the data to the first memory block.

The controller may sort indexes indicating the storage of the data to the first memory block in an order of a logical page number (LPN) of the data in a physical to logical (P2L) table for the data.

In an embodiment, an operating method of a memory system comparing a plurality of memory blocks each having a plurality of pages, may include: storing data in a first memory block of the memory blocks; generating map data corresponding to the data stored in the first memory block by sorting map segments of the map data based on logical information of the data; and storing the map data in a second memory block of the memory blocks.

The operating method of the memory system may further include: loading the map data from the second memory block to a memory of the controller; and scanning the sorted map segments of the map data for a first map segment of first data corresponding to a command received from a host.

The scanning of the map data may further include: confirming a position of the first map segment through the scanning based on logical information of the first data in the map segments of the map data; and shifting a second map segment existing in the confirmed position, thereby generating an empty area in the map data.

The scanning of the map data may further include: storing the first data in the first memory block; and recording the first map segment corresponding to storage of the first data to the first memory block in the empty area, thereby updating the map data.

The updating of the map data may include: storing the updated map data in the memory and the second memory block.

The scanning of the map data may further include: confirming the first map segment through the scanning based on logical information of the first data in the sorted map segments of the map data; and reading the first data stored in the first memory block through the first map segment confirmed in the map data and providing the read first data to the host.

The generating of the map data may include: sorting indexes indicating the storage of the data to the first memory block based on the logical information of the data in a map list for the map segments; and storing the sorted indexes in a memory of the controller.

The logical information of the data may include a logical page number (LPN) of the data stored in the first memory block.

The map segments may include physical to logical (P2L) segments for the data in correspondence to the storage of the data to the first memory block.

The generating of the map data may include: sorting indexes indicating the storage of data to the first memory block in an order of a logical page number (LPN) of the data in a physical to logical (P2L) table for the data.

DETAILED DESCRIPTION

Figure 1:
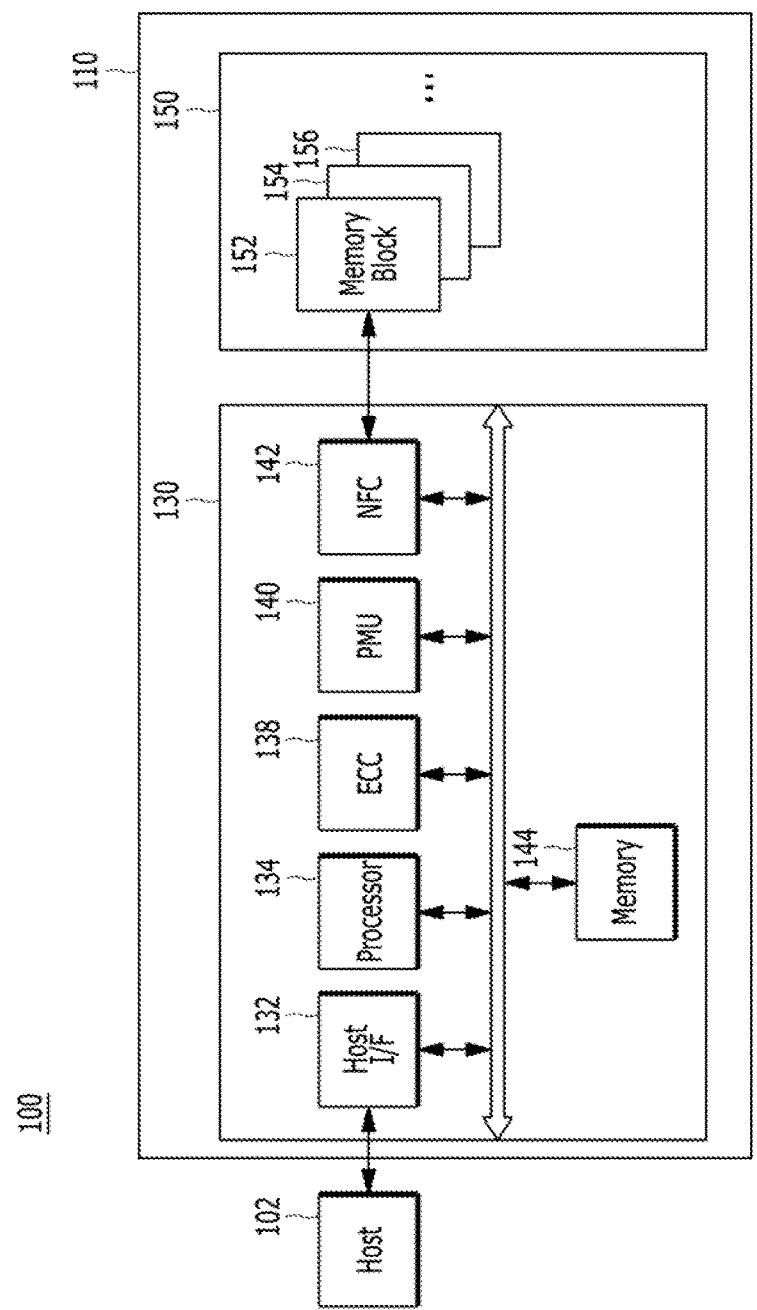
FIG. 1 is a diagram illustrating a data processing system including a memory system according to an embodiment of the present invention.

Various embodiments will be described with reference to the accompanying drawings. It is noted, however, that the present invention may be embodied in different forms and should not be construed as being limited to the embodiments set forth herein. Rather, these embodiments are provided so that this disclosure is thorough and complete. Throughout the disclosure, like reference numerals are used to refer to like parts in the various figures and embodiments of the present invention.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via an intervening element therebetween. It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or groups thereof. As used herein, the term "and/or" includes any and all combinations of one or more of the associated listed items. Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, numerous specific details are set forth in order to provide a thorough understanding of the present disclosure. The present disclosure may be practiced without some or all of these specific details. In other instances, well-known process structures and/or processes have not been described in detail in order not to unnecessarily obscure the present disclosure.

Hereinafter, the various embodiments of the present disclosure will be described in details with reference to attached drawings.

Referring now to FIG. 1, a data processing system 100 is provided, according to an embodiment of the present invention. The data processing system 100 may include a host 102 and a memory system 110.

The host 102 may include any suitable electronic device. For example, the host 102 may include a portable electronic device such as a mobile phone, an MP3 player, a laptop computer and the like. The host may include a non-portable electronic device such as a desktop computer, a game player, a TV, a projector and the like.

The memory system 110 may store data to be accessed by the host 102 in response to a request from the host 102. The memory system 110 may be used as a main memory system or an auxiliary memory system of the host 102. The memory system 110 may be implemented to be coupled electrically with the host 102, according to a protocol of a host interface. One or more semiconductor memory devices may be used. Volatile or non-volatile memory devices may be used. For example, the memory system 110 may be implemented with a solid state drive (SSD), a multimedia card (MMC), an embedded MMC (eMMC), a reduced size MMC (RS-MMC) and a micro-MMC, a secure digital (SD) card, a mini-SD and a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device, such as a dynamic random access memory (DRAM), a static random access memory (SRAM) and the like. Alternatively, the storage devices for the memory system 110 may be implemented a nonvolatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), a resistive RAM (RRAM) and the like.

The memory system 110 may include a memory device 150 for storing data and a controller 130 for controlling storage of data in the memory device 150. The stored data in the memory device 150 may be accessed by the host 102.

The controller 130 and the memory device 150 may be integrated into a single semiconductor device. For instance, the controller 130 and the memory device 150 may be integrated into a semiconductor device configured as a solid state drive (SSD). Configuring the memory system 110 as a SSD, may generally allow a significant increase in an operation speed of the host 102.

The controller 130 and the memory device 150 may be integrated into a semiconductor device configured as a memory card, such as a Personal Computer Memory Card International Association (PCMCIA) card, a compact flash (CF) card, a smart media (SM) card (SMC), a memory stick, a multimedia card (MMC), an RS-MMC and a micro-MMC, a secure digital (SD) card, a mini-SD, a micro-SD and an SDHC, a universal flash storage (UFS) device and the like.

Also, for example, the memory system 110 may be or comprise a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a three-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, an RFID device, one of various component elements configuring a computing system and the like.

The memory device 150 may store data provided from the host 102. During a read operation, the memory device 150 may provide the stored data to the host 102. One or more memory devices 150 may be employed. The one or more memory devices 150 may be substantially identical. The one or more memory devices may be different memory devices. The memory device 150 may include one or more memory blocks 152, 154 and 156. Each of the memory blocks 152, 154 and 156 may include a plurality of pages. Each of the pages may include a plurality of memory cells coupled electrically to a plurality of word lines (WL). The memory device 150 may be a nonvolatile memory device capable of retaining stored data even when a power supply is interrupted or turned off. According to an embodiment, the memory device may be a flash memory. The memory device may be a flash memory device having a three-dimensional (3D) stack structure. Examples of a non-volatile memory device 150 having a three-dimensional (3D) stack structure are described later herein with reference to FIGS. 2 to 11.

The controller 130 may control the overall operation of the memory device 150, such as, read, write, program and/or erase operations. Generally, the controller 130 may control the memory device 150 in response to a request from the host 102. For example, the controller 130 may provide data read from the memory device 150, to the host 102, in response to a read request from the host 102. Or, also as an example, the controller may store data provided from the host 102 into the memory device 150 in response to a write request.

Any suitable controller may be used. For example, the controller 130 may include a host interface unit 132, a processor 134, an error correction code (ECC) unit 138, a power management unit (PMU) 140, a NAND flash controller (NFC) 142, and a memory 144.

The host interface unit 132 may process commands and/or data provided from the host 102. The host interface unit 132 may communicate with the host 102 through at least one of various interface protocols, such as a universal serial bus (USB), a multimedia card (MMC), a peripheral component interconnect-express (PCI-E), a serial attached SCSI (SAS), a serial advanced technology attachment (SATA), a parallel advanced technology attachment (PATA), a small computer system interface (SCSI), an enhanced small disk interface (ESDI), integrated drive electronics (IDE) and the like. The host interface unit 132 may include any suitable circuits, systems or devices suitable for communicating with the host 102 and the other components of the controller 130 as may be needed.

The ECC unit 138 may detect and correct errors of the data read from the memory device 150 during a read operation. Various detection and correction techniques may be employed. For example, if the number of the error bits detected by the ECC unit 138 is greater than or equal to a threshold number of correctable error bits, the ECC unit 138 may not correct the error bits and output an error correction fail signal indicating failure in correcting the error bits.

The ECC unit 138 may perform an error correction operation based on any suitable error correction scheme. For example, the ECC unit 138 may perform an error correction operation based on a coded modulation scheme, such as, for example, a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and the like. The ECC unit 138 may include any suitable circuits, systems or devices required for an error detection and correction operation.

The PMU 140 may provide and manage electric power for the controller 130. For example, the PMU 140 may provide and manage electric power for the various components of the controller 130 as may be needed.

The NFC 142 may serve as a memory interface between the controller 130 and the memory device 150 to allow the controller 130 to control the memory device 150 in response to a request from the host 102. For example, the NFC 142 may generate control signals for the memory device 150. The NFC may process data under the control of the processor 134, for example, when the memory device 150 is a flash memory especially a NAND flash memory.

The memory 144 may serve as a working memory of the memory system 110 and the controller 130, and store data for driving the memory system 110 and the controller 130. For example, when the controller 130 controls the operations of the memory device 150, the memory 144 may store data used by the controller 130 and the memory device 150 for such operations as read, write, program and erase operations.

The memory 144 may be or comprise a volatile memory. For example, the memory 144 may be or comprise a static random access memory (SRAM) or a dynamic random access memory (DRAM). As described above, the memory 144 may store data used by the host 102 and the memory device 150 for read and/or write operations. The memory 144 may be or comprise a program memory, a data memory, a write buffer, a read buffer, a map buffer, and the like.

The processor 134 may control the general operations of the memory system 110. For example, the processor 134 may control a write operation for the memory device 150, in response to a write request from the host 102. Also, for example, the processor 134 may control a read operation for the memory device 150, in response to a read request from the host 102. The processor 134 may drive a firmware, also referred to as a flash translation layer (FTL), for controlling the general operations of the memory system 110. The processor 134 may be implemented with a microprocessor, a central processing unit (CPU) and the like. Any suitable processor may be used.

For example, a management unit (not shown) may be included in the processor 134 for performing bad block management of the memory device 150. Accordingly, the management unit may find bad memory blocks included in the memory device 150, i.e., memory blocks which are in an unsatisfactory condition for further use, and perform a bad block management operation the bad memory blocks. For example, when a flash memory, such as a NAND flash memory is employed as the memory device 150, a program failure may occur during a write operation due to inherent characteristics of a NAND logic function. During a bad block management, the data of the program-failed memory blocks (e.g., the bad memory blocks) may be programmed into a new memory block. The bad blocks due to a program fall may seriously deteriorate the utilization efficiency of a memory device, especially one having a 3D stack structure and thus negatively affect the reliability of the memory system 110.

Figure 2:
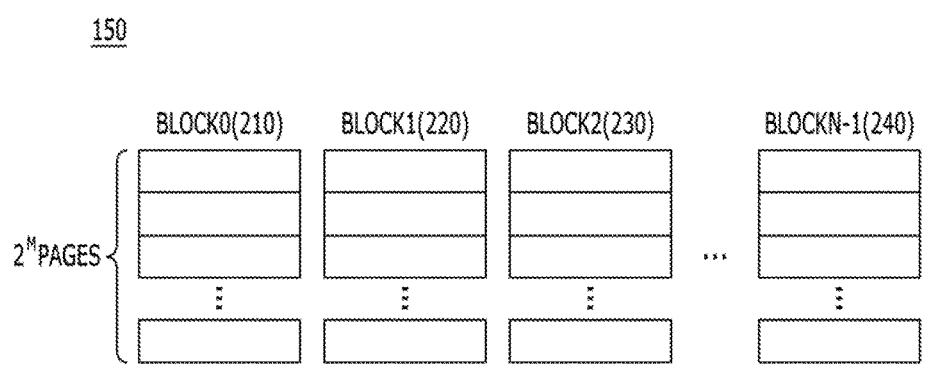
FIG. 2 is a diagram illustrating an example of a memory device employed in the memory system of FIG. 1, according to an embodiment of the present invention.

Referring to FIG. 2 the memory device 150 may include a plurality of memory blocks, for example, zeroth to (N−1)$^{th}$ blocks 210 to 240, where N is a positive integer. Each of the plurality of memory blocks 210 to 240 may include a plurality of pages, for example, 2$^M$ number of pages (2$^M$ PAGES), where M is a positive integer. Each of the plurality of pages may include a plurality of memory cells to which a plurality of word lines may be coupled electrically. It is noted that any number of suitable blocks and pages per block may be employed.

The memory blocks may be single level cell (SLC) memory blocks and/or multi-level cell (MLC) memory blocks, according to the number of bits which may be stored or expressed in each memory cell. An SLC memory block may include a plurality of pages which are implemented with memory cells each of which is capable of storing 1-bit data. An MLC memory block may include a plurality of pages which are implemented with memory cells each of which is capable of storing multi-bit data, for example, two or more-bit data. A MLC memory block including a plurality of pages which are implemented with memory cells each of which is capable of storing 3-bit data may be employed and will be referred to as a triple level cell (TLC) memory block.

Each of the plurality of memory blocks 210 to 240 may store data provided from the host device 102 during a write operation, and may provide stored data to the host 102 during a read operation.

Figure 3:
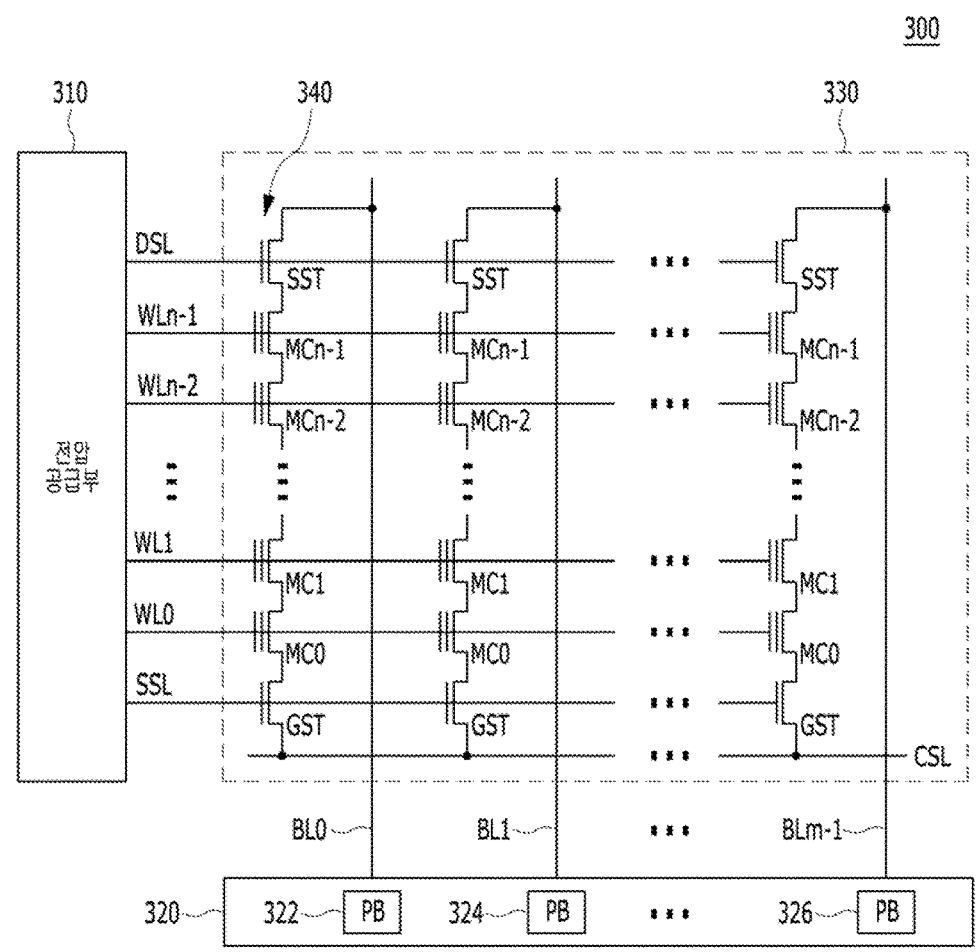
FIG. 3 is a circuit diagram illustrating a memory block employed in a memory device of FIG. 1, according to an embodiment of the present invention.

Referring to FIG. 3, a memory block 152 of the memory device 150 may include a plurality of cell strings 340 coupled electrically to bit lines BL0 to BLm−1, respectively. Each cell string 340 may include at least one drain select transistor DST and at least one source select transistor SST. A plurality of memory cells or a plurality of memory cell transistors MC0 to MCn−1 may be coupled electrically in series between the select transistors DST and SST. The respective memory cells MC0 to MCn−1 may consist of multi-level cells (MLC) each of which stores data information of a plurality of bits. The memory cells may have any suitable architecture.

In FIG. 3, 'DSL' denotes a drain select line, 'SSL' denotes a source select line, and 'CSL' denotes a common source line.

FIG. 3 shows, as an example, a memory block 152 configured by NAND flash memory cells. It is to be noted, however, that the memory block 152 is not limited to NAND flash memory and may be realized, in other embodiments, by NOR flash memory, hybrid flash memory having at least two kinds of memory cells combined, or a NAND flash memory having a controller built in a memory chip. Also, the operational characteristics of a semiconductor device may be applied to not only a flash memory device in which a charge storing layer is configured by conductive floating gates but also to a charge trap flash (CTF) in which a charge storing layer is configured by a dielectric layer.

It is also noted that the memory device 150 is not limited to a flash memory device only. For example, the memory device 150 may be a DRAM or a SRAM device.

A voltage generator 310 of the memory device 150 may generate word line voltages, for example, a program voltage, a read voltage or a pass voltage, to be supplied to respective word lines according to an operation mode. The voltage generator 310 may generate voltages to be supplied to bulks, for example, well regions in which the memory cells are formed. The voltage generator 310 may perform a voltage generating operation under a control of a control circuit (not shown). The voltage generator 310 may generate a plurality of variable read voltages to generate a plurality of read data. The voltage generator 310 may select one of the memory blocks or sectors of a memory cell array, select one of the word lines of the selected memory block, and provide the word line voltages to the selected word line and unselected word lines, under the control of the control circuit.

A read/write circuit 320 of the memory device 150 may be controlled by the control circuit, and may serve as a sense amplifier or a write driver according to an operation mode. During a verification/normal read operation, the read/write circuit 320 may serve as a sense amplifier for reading data from the memory cell array. Also, during a program operation, the read/write circuit 320 may serve as a write driver for driving bit lines according to data to be stored in the memory cell array. The read/write circuit 320 may receive data to be written in the memory cell array, from a buffer (not shown), during the program operation, and may drive the bit lines according to the inputted data. To this end, the read/write circuit 320 may include a plurality of page buffers 322, 324 and 326 respectively corresponding to the columns (or bit lines) or pairs of the columns (or pairs of bit lines). Each of the page buffers 322, 324 and 326 may include a plurality of latches (not shown).

Figure 4:
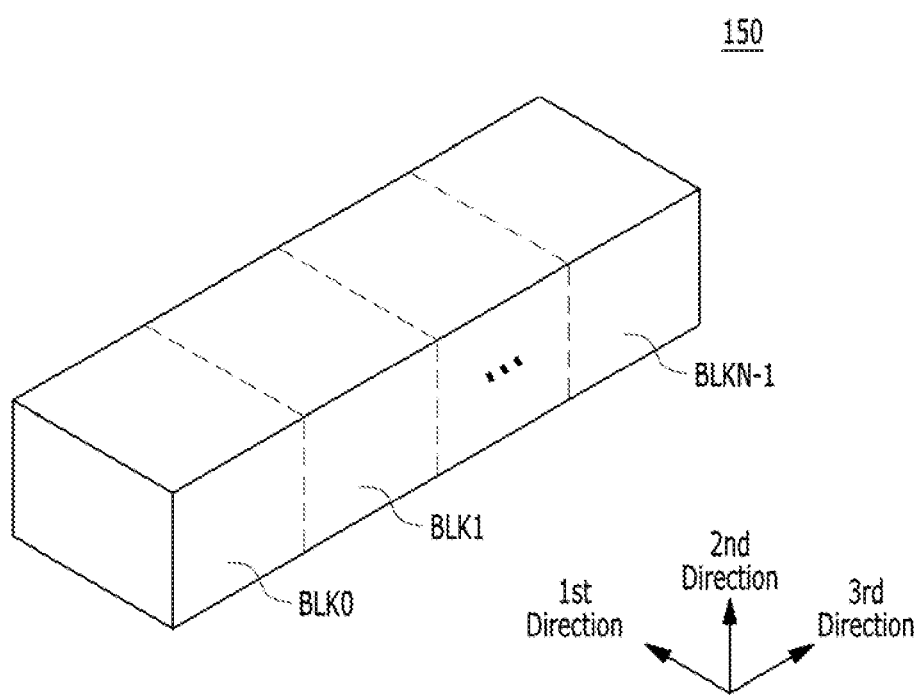
FIGS. 4 to 11 are diagrams schematically illustrating various aspects of the memory device shown in FIG. 2 according to an embodiment of the present invention.

FIG. 4 is a block diagram illustrating an example of the plurality of memory blocks 152 to 156 of the memory device 150, according to an embodiment of the present invention.

As shown in FIG. 4, the memory device 150 may include a plurality of memory blocks BLK0 to BLKN−1. Each of the memory blocks BLK0 to BLKN−1 may be realized in a 3D structure or a vertical structure. The respective memory blocks BLK0 to BLKN−1 may include a plurality of structures extending in first to third directions, for example, an x-axis direction, a y-axis direction and a z-axis direction.

Figure 8:
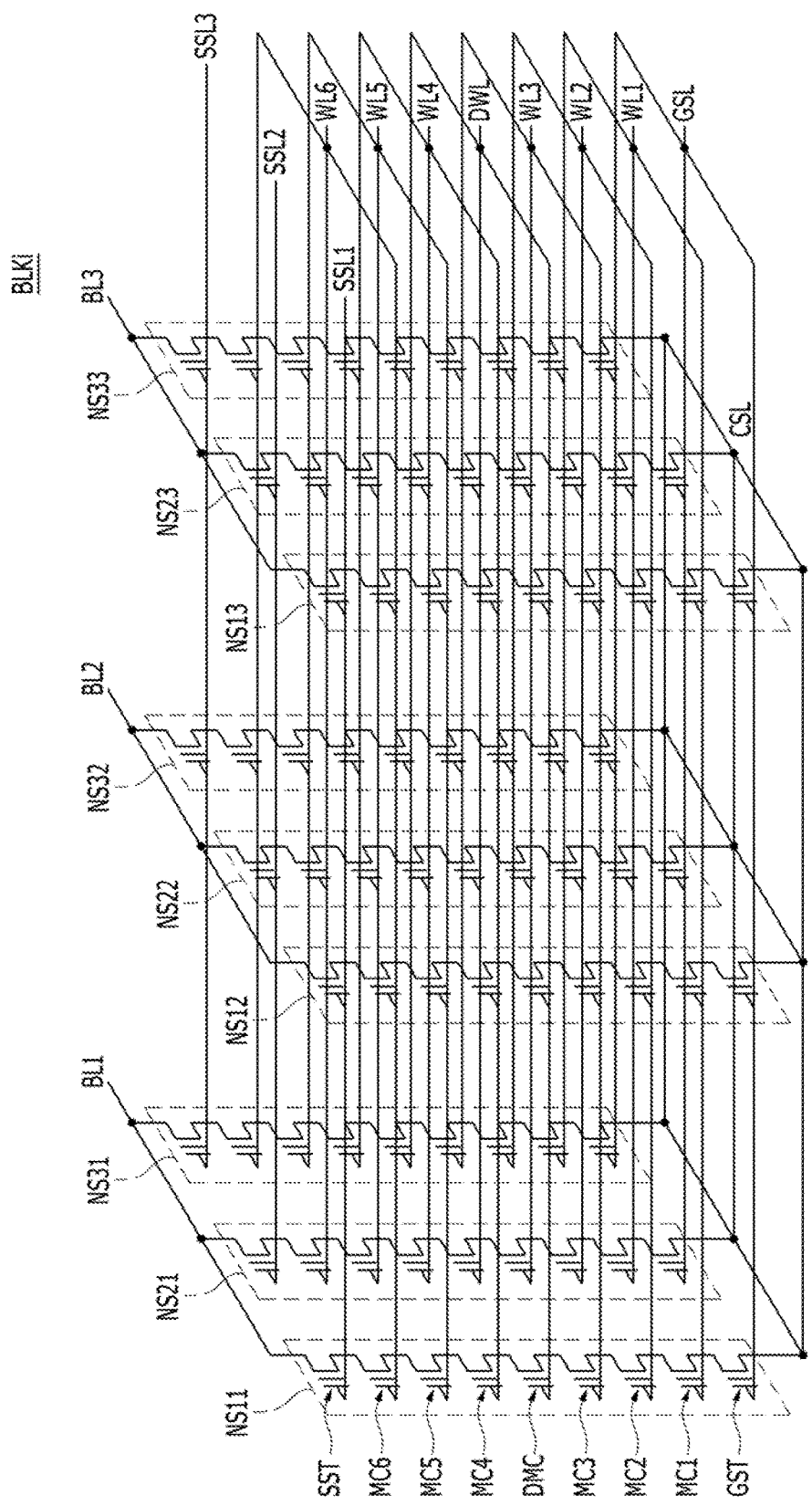

The respective memory blocks BLK0 to BLKN−1 may include a plurality of NAND strings NS extending in the second direction (FIG. 8). The plurality of NAND strings NS may be provided in the first direction and the third direction. Each NAND string NS may be coupled electrically to a bit line BL, at least one source select line SSL, at least one ground select line GSL, a plurality of word lines WL, at least one dummy word line DWL, and a common source line CSL. The respective memory blocks BLK0 to BLKN−1 may be coupled electrically to a plurality of bit lines BL, a plurality of source select lines SSL, a plurality of ground select lines GSL, a plurality of word lines WL, a plurality of dummy word lines DWL, and a plurality of common source lines CSL.

Figure 5:
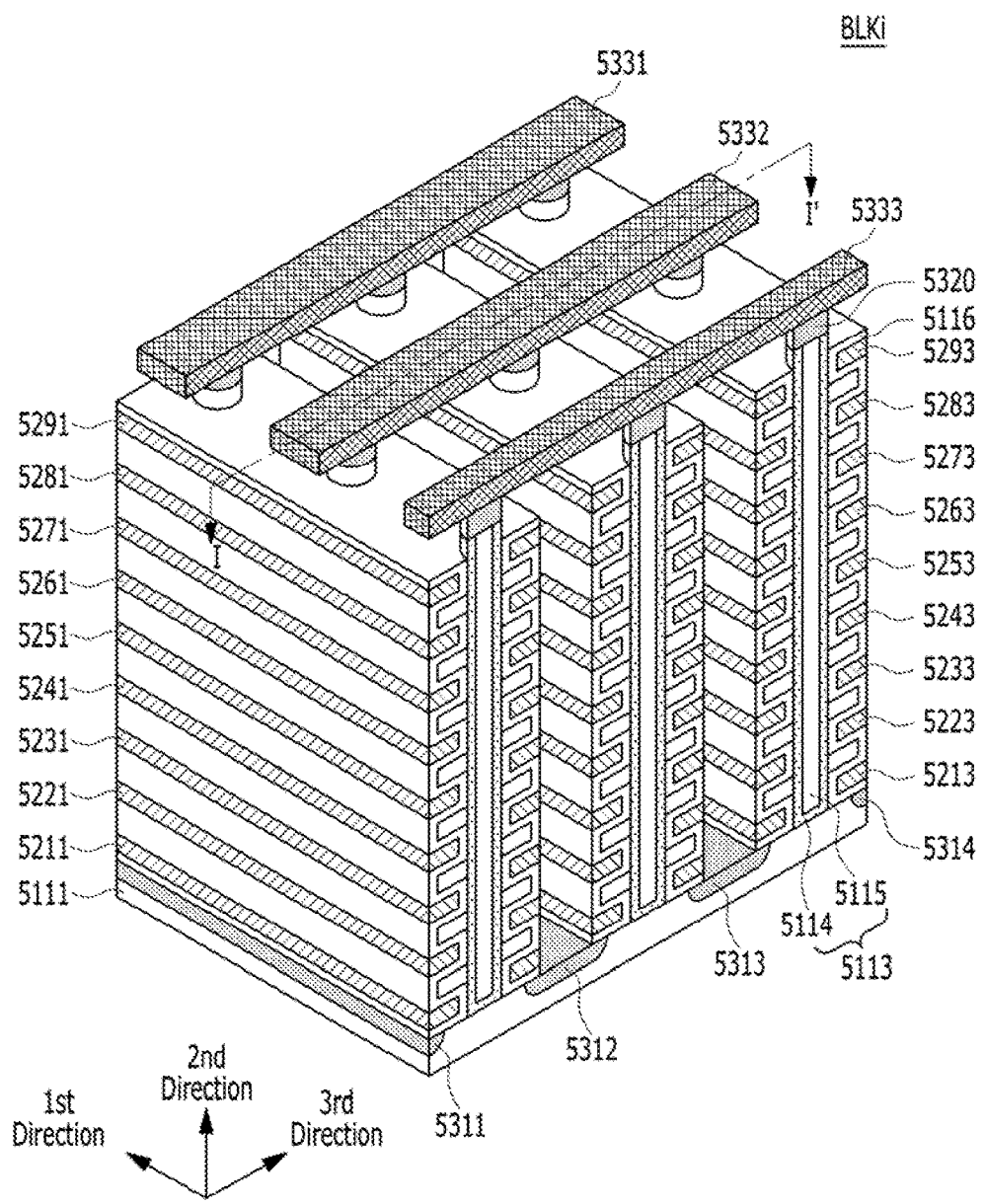
Figure 6:
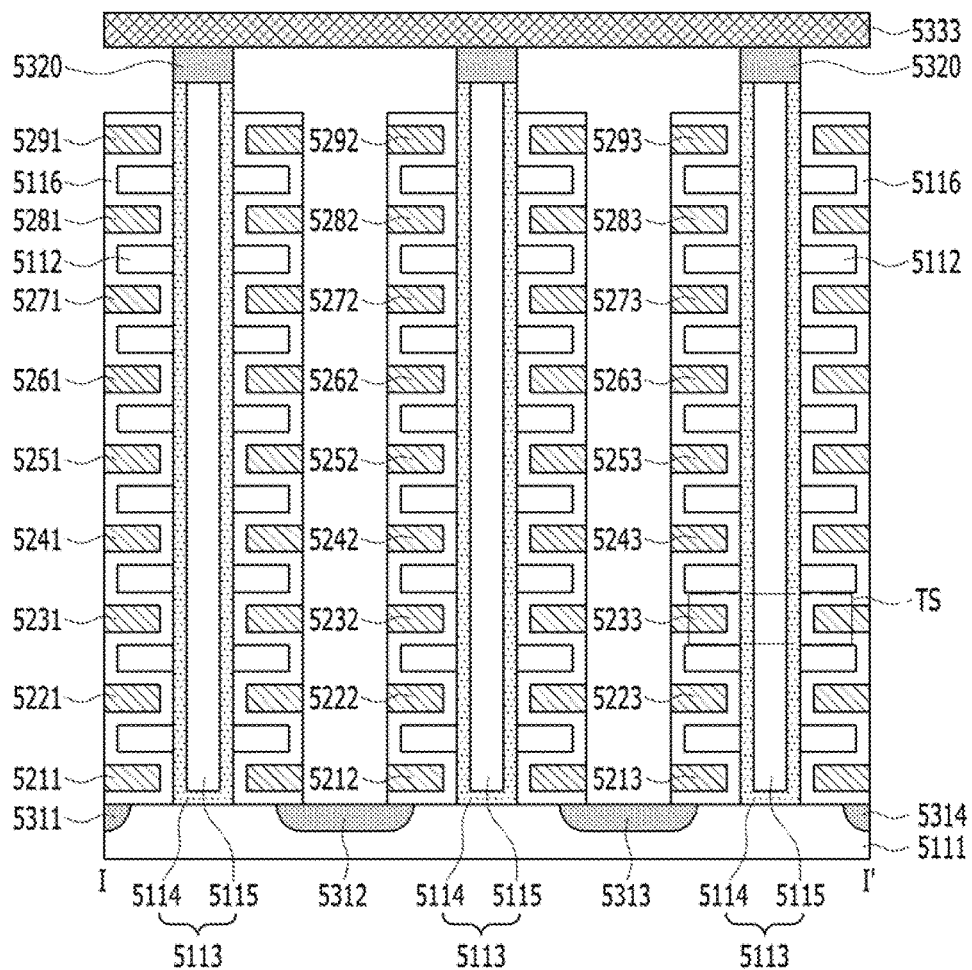

FIG. 5 is a perspective view of one memory block BLKi of the plurality memory blocks BLK0 to BLKN−1 shown in FIG. 4. FIG. 6 is a cross-sectional view taken along a line I-I' of the memory block BLKi shown in FIG. 5.

Referring to FIGS. 5 and 6, memory block BLKi may include a structure extending in the first to third directions.

The memory block may include a substrate 5111 including a silicon material doped with a first type impurity. For example, the substrate 5111 may include a silicon material doped with a p-type impurity. The substrate 5111 may be a p-type well, for example, a pocket p-well. The substrate 5111 may further include an n-type well surrounding the p-type well. Although, in the embodiment of the present invention, the substrate 5111 is exemplified as being the p-type silicon, it is to be noted that the substrate 5111 is not limited to the p-type silicon.

A plurality of doping regions 5311 to 5314 extending in the first direction may be provided over the substrate 5111. The doping regions are spaced apart at regular intervals in the third direction. The plurality of doping regions 5311 to 5314 may contain a second type impurity that is different from that of the impurity used in substrate 5111. For example, the plurality of doping regions 5311 to 5314 may be doped with an n-type impurity. Although, in the embodiment of the present invention, first to fourth doping regions 5311 to 5314 are exemplified as being the n-type, it is noted that they are not limited to the n-type.

In the region over the substrate 5111 between the first and second doping regions 5311 and 5312, a plurality of dielectric material regions 5112 extending in the first direction may be spaced apart at regular intervals in the second direction. The dielectric material regions 5112 may also be separated from the substrate 5111 by a preset distance in the second direction. Each of the dielectric material regions 5112 may be separated from one other by a preset distance in the second direction. The dielectric materials 5112 may include any suitable dielectric material, such as, silicon oxide.

In the regions over the substrate 5111 between two consecutive doping regions, for example, between doping regions 5311 and 5312, a plurality of pillars 5113 are spaced apart at regular intervals in the first direction. The plurality of pillars 5113 extend in the second direction and may pass through the dielectric material regions 5112 so that they may be coupled electrically with the substrate 5111. Each pillar 5113 may include one or more materials. For example, each pillar 5113 may include an in inner layer 5115 and an outer surface layer 5114. The surface layer 5114 may include a doped silicon material doped with an impurity. For example, the surface layer 5114 may include a silicon material doped with the same or same type impurity as the substrate 5111. Although, in the embodiment of the present invention, the surface layer 5114 is exemplified as including p-type silicon, the surface layer 5114 is not limited to the p-type silicon and other embodiments may readily envisaged by the skilled person wherein the substrate 5111 and the surface layer 5114 of the pillars 5113 may be doped with an n-type impurity.

The inner layer 5115 of each pillar 5113 may be formed of a dielectric material. The inner layer 5115 may be or include a dielectric material such as silicon oxide.

In the regions between the first and second doping regions 5311 and 5312, a dielectric layer 5116 may be provided along exposed surfaces of the dielectric material regions 5112, the pillars 5113 and the substrate 5111. A thickness of the dielectric layer 5116 may be less than one half of the distance between the dielectric material regions 5112. In other words, a region of a material other than the dielectric material 5112 and the dielectric layer 5116 may be provided between (i) the dielectric layer 5116 below the bottom surface of a first dielectric material of the dielectric material regions 5112 and (ii) the dielectric layer 5116 provided over the top surface of a second dielectric material of the dielectric material regions 5112. The dielectric material regions 5112 may lie below the first dielectric material.

In the regions between consecutive doping regions such as in the region between the first and second doping regions 5311 and 5312, a plurality of conductive material regions 5211 to 5291 may be provided over an exposed surface of the dielectric layer 5116. The plurality of the conductive material regions extending in the first direction may be spaced apart at regular intervals in the second direction in an interleaving configuration with the plurality of the dielectric material regions 5112. The dielectric layers 5116 fill the space between the conductive material regions and the dielectric material regions 5112. So for example, the conductive material region 5211 extending in the first direction may be provided between the dielectric material region 5112 adjacent to the substrate 5111 and the substrate 5111. In particular, the conductive material region 5211 extending in the first direction may be provided between (i) the dielectric layer 5116 disposed over the substrate 5111 and (ii) the dielectric layer 5116 disposed below the bottom surface of the dielectric material region 5112 adjacent to the substrate 5111.

Each of the conductive material regions 5211 to 5291 extending in the first direction may be provided between (i) a dielectric layer 5116 disposed over the top surface of one of the dielectric material regions 5112 and (ii) the dielectric layer 5116 disposed below the bottom surface of the next dielectric material region 5112. The conductive material regions 5221 to 5281 extending in the first direction may be provided between the dielectric material regions 5112. The top conductive material region 5291 extending in the first direction may be provided over the uppermost dielectric material 5112. The conductive material regions 5211 to 5291 extending in the first direction may be made of or include a metallic material. The conductive material regions 5211 to 5291 extending in the first direction may be made of or include a conductive material such as polysilicon.

In the region between the second doping region 5312 and third doping region 5313, the same structures as the structures between the first and second doping regions 5311 and 5312 may be provided. For example, in the region between the second and third doping regions 5312 and 5313, the plurality of dielectric material regions 5112 extending in the first direction, the plurality of pillars 5113 which are sequentially arranged in the first direction and pass through the plurality of dielectric material regions 5112 in the second direction, the dielectric layer 5116 which is provided over the exposed surfaces of the plurality of dielectric material regions 5112 and the plurality of pillars 5113, and the plurality of conductive material regions 5212 to 5292 extending in the first direction may be provided.

In the region between the third doping region 5313 and a fourth doping region 5314, the same structures as between the first and second doping regions 5311 and 5312 may be provided. For example, in the region between the third and fourth doping regions 5313 and 5314, the plurality of dielectric material regions 5112 extending in the first direction, the plurality of pillars 5113 which are sequentially arranged in the first direction and pass through the plurality of dielectric material regions 5112 in the second direction, the dielectric layer 5116 which is provided over the exposed surfaces of the plurality of dielectric material regions 5112 and the plurality of pillars 5113, and the plurality of conductive material regions 5213 to 5293 extending in the first direction may be provided.

Drains 5320 may be respectively provided over the plurality of pillars 5113. The drains 5320 may be made of silicon materials doped with second type impurities. The drains 5320 may be made of silicon materials doped with n-type impurities. Although for the sake of convenience of explanation, the drains 5320 are exemplified as including n-type silicon, it is noted that the drains 5320 are not limited to the n-type silicon. For example, the width of each drain 5320 may be larger than the width of each corresponding pillar 5113. Each drain 5320 may be provided in the shape of a pad over the top surface of each corresponding pillar 5113.

Conductive material regions 5331 to 5333 extending in the third direction may be provided over the drains 5320. Each of the conductive material regions 5331 to 5333 may be extendedly disposed over the drains 5320 serially arranged in the third direction with a preset separation distance to each other in the first direction. The respective conductive material regions 5331 to 5333 may be coupled electrically with the drains 5320 therebelow. The drains 5320 and the conductive material regions 5331 to 5333 extending in the third direction may be coupled electrically with through contact plugs. The conductive material regions 5331 to 5333 extending in the third direction may be made of a metallic material. The conductive material regions 5331 to 5333 extending in the third direction may be made of a conductive material such as polysilicon.

In FIGS. 5 and 6, the respective pillars 5113 may form strings together with the dielectric layer 5116 and the conductive material regions 5211 to 5291, 5212 to 5292 and 5213 to 5293 extending in the first direction. The respective pillars 5113 may form NAND strings NS together with the dielectric layer 5116 and the conductive material regions 5211 to 5291, 5212 to 5292 and 5213 to 5293 extending in the first direction. Each NAND string NS may include a plurality of transistor structures TS.

Figure 7:
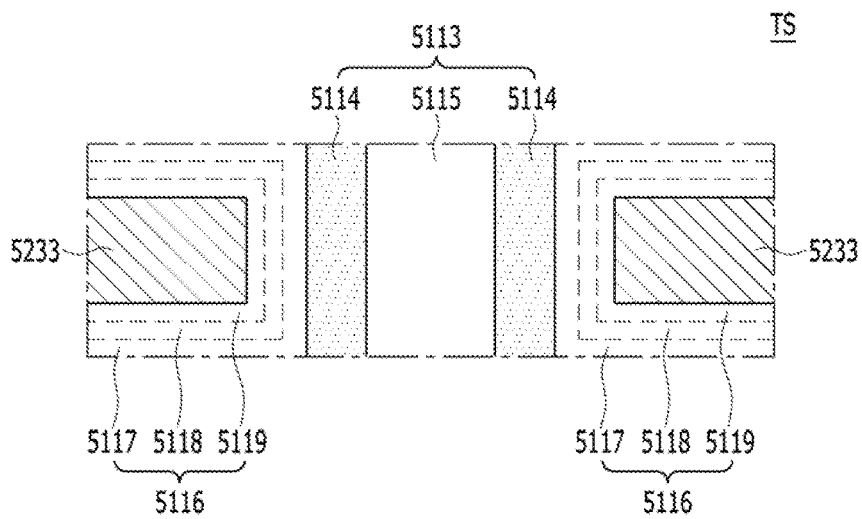

Referring now to FIG. 7, in the transistor structure TS shown in FIG. 6, the dielectric layer 5116 may include first to third sub dielectric layers 5117, 5118 and 5119.

The surface layer 5114 of p-type silicon in each of the pillars 5113 may serve as a body. The first sub dielectric layer 5117 adjacent to the pillar 5113 may serve as a tunneling dielectric layer, and may include a thermal oxidation layer.

The second sub dielectric layer 5118 may serve as a charge storing layer. The second sub dielectric layer 5118 may serve as a charge capturing layer, and may include a nitride layer or a metal oxide layer such as an aluminum oxide layer, a hafnium oxide layer, or the like.

The third sub dielectric layer 5119 adjacent to the conductive material 5233 may serve as a blocking dielectric layer. The third sub dielectric layer 5119 adjacent to the conductive material 5233 extending in the first direction may be formed as a single layer or multiple layers. The third sub dielectric layer 5119 may be a high-k dielectric layer such as an aluminum oxide layer, a hafnium oxide layer, or the like, which has a dielectric constant greater than the first and second sub dielectric layers 5117 and 5118.

The conductive material 5233 may serve as a gate or a control gate. For example, the gate or the control gate 5233, the blocking dielectric layer 5119, the charge storing layer 5118, the tunneling dielectric layer 5117 and the body 5114 may form a transistor or a memory cell transistor structure. For example, the first to third sub dielectric layers 5117 to 5119 may form an oxide-nitride-oxide (ONO) structure. In the embodiment, for the sake of convenience of explanation, the surface layer 5114 of p-type silicon in each of the pillars 5113 will be referred to as a body in the second direction.

The memory block BLKi may include the plurality of pillars 5113. For example, the memory block BLKi may include the plurality of NAND strings NS. In detail, the memory block BLKi may include the plurality of NAND strings NS extending in the second direction or a direction perpendicular to the substrate 5111.

Each NAND string NS may include the plurality of transistor structures TS which are disposed in the second direction. At least one of the plurality of transistor structures TS of each NAND string NS may serve as a string source transistor SST. At least one of the plurality of transistor structures TS of each NAND string NS may serve as a ground select transistor GST.

The gates or control gates may correspond to the conductive material regions 5211 to 5291, 5212 to 5292 and 5213 to 5293 extending in the first direction. For example, the gates or the control gates may extend in the first direction and form word lines and at least two select lines including at least one source select line SSL and at least one ground select line GSL.

The conductive material regions 5331 to 5333 extending in the third direction may be coupled electrically to one end of the NAND strings NS. The conductive material regions 5331 to 5333 extending in the third direction may serve as bit lines BL. For example, in one memory block BLKi, the plurality of NAND strings NS may be coupled electrically to one-bit line BL.

The second type doping regions 5311 to 5314 extending in the first direction may be provided to the other ends of the NAND strings NS. The second type doping regions 5311 to 5314 extending in the first direction may serve as common source lines CSL.

For example, the memory block BLKi may include a plurality of NAND strings NS extending in a direction perpendicular to the substrate 5111, e.g., the second direction, and may serve as a NAND flash memory block, for example, of a charge capturing type memory, in which the plurality of NAND strings NS are coupled electrically to one-bit line BL.

Although it is illustrated in FIGS. 5 to 7 that the conductive material regions 5211 to 5291, 5212 to 5292 and 5213 to 5293 extending in the first direction are provided by nine (9) layers, it is noted that the conductive material regions 5211 to 5291, 5212 to 5292 and 5213 to 5293 extending in the first direction are not limited thereto. For example, conductive material regions extending in the first direction may be provided in eight (8) layers, sixteen (16) layers or any multiple layers. For example, in one NAND string NS, the number of transistors may be 8, 16 or more.

Although it is illustrated in FIGS. 5 to 7 that three (3) NAND strings NS are coupled electrically to one-bit line BL, it is noted that the embodiment is not limited thereto. In the memory block BLKi, m NAND strings NS may be coupled electrically to one-bit line BL, m being a positive integer. The number of conductive material regions 5211 to 5291, 5212 to 5292 and 5213 to 5293 extending in the first direction and the number of common source lines 5311 to 5314 may be varied with the number of NAND strings NS which are coupled electrically to one-bit line BL.

Further, although it is illustrated in FIGS. 5 to 7 that three (3) NAND strings NS are coupled electrically to one conductive material extending in the first direction, it is noted that the embodiment is not limited thereto. For example, n NAND strings NS may be coupled electrically to one conductive material extending in the first direction, n being a positive integer. The number of bit lines 5331 to 5333 may be varied with the number of NAND strings NS which are coupled electrically to one conductive material extending in the first direction.

Referring to FIG. 8, in a block BLKi having the first structure, a plurality of NAND strings NS11 to NS31 may be provided between a first bit line BL1 and a common source line CSL. The first bit line BL1 may correspond to the conductive material region 5331 of FIGS. 5 and 6, extending in the third direction. NAND strings NS12 to NS32 may be provided between a second bit line BL2 and the common source line CSL. The second bit line BL2 may correspond to the conductive material region 5332 of FIGS. 5 and 6, extending in the third direction. NAND strings NS13 to NS33 may be provided between a third bit line BL3 and the common source line CSL. The third bit line BL3 may correspond to the conductive material region 5333 of FIGS. 5 and 6, extending in the third direction.

A source select transistor SST of each NAND string NS may be coupled electrically to a corresponding bit line BL. A ground select transistor GST of each NAND string NS may be coupled electrically to the common source line CSL. Memory cells MC1 and MC6 may be provided between the source select transistor SST and the ground select transistor GST of each NAND string NS.

In this example, the NAND strings NS may be defined by units of rows and columns. The NAND strings NS which are coupled electrically to one-bit line may form one column. The NAND strings NS11 to NS31 which are coupled electrically to the first bit line BL1 may correspond to a first column. The NAND strings NS12 to NS32 which are coupled electrically to the second bit line BL2 may correspond to a second column. The NAND strings NS13 to NS33 which are coupled electrically to the third bit line BL3 may correspond to a third column. The NAND strings NS which are coupled electrically to one source select line SSL may form one row. The NAND strings NS11 to NS13 which are coupled electrically to a first source select line SSL1 may form a first row. The NAND strings NS21 to NS23 which are coupled electrically to a second source select line SSL2 may form a second row. The NAND strings NS31 to NS33 which are coupled electrically to a third source select line SSL3 may form a third row.

In each NAND string NS, a height may be defined. In each NAND string NS, the height of the memory cell MC1 adjacent to the ground select transistor GST may have, for example, a value '1'. In each NAND string NS, the height of a memory cell may increase as the memory cell gets closer to the source select transistor SST when measured from the substrate 5111. For example, in each NAND string NS, the height of a memory cell MC6 adjacent to the source select transistor SST may have, for example, a value '7'.

The source select transistors SST of the NAND strings NS arranged in the same row may share the source select line SSL. The source select transistors SST of the NAND strings NS arranged in different rows may be respectively coupled electrically to the different source select lines SSL1, SSL2 and SSL3.

The memory cells at the same height in the NAND strings NS in the same row may share a word line WL. For example, at the same height, the word lines WL coupled electrically to the memory cells MC of the NAND strings NS in different rows may be coupled electrically with each other. Dummy memory cells DMC at the same height in the NAND strings NS of the same row may share a dummy word line DWL. For example, at the same height or level, the dummy word lines DWL coupled electrically to the dummy memory cells DMC of the NAND strings NS in different rows may be coupled electrically with each other.

The word lines WL or the dummy word lines DWL located at the same level or height or layer may be coupled electrically with each other for each of the layers where the conductive material regions 5211 to 5291, 5212 to 5292 and 5213 to 5293 extending in the first direction may be provided. The conductive material regions 5211 to 5291, 5212 to 5292 and 5213 to 5293 extending in the first direction may be coupled electrically in common to upper layers through contacts. In other words, the ground select transistors GST of the NAND strings NS in the same row may share the ground select line GSL. Further, the ground select transistors GST of the NAND strings NS in different rows may share the ground select line GSL. For example, the NAND strings NS11 to NS13, NS21 to NS23 and NS31 to NS33 may be coupled electrically in common to the ground select line GSL.

The common source line CSL may be coupled electrically in common to the NAND strings NS. Over the active regions over the substrate 5111, the first to fourth doping regions 5311 to 5314 may be coupled electrically. The first to fourth doping regions 5311 to 5314 may be coupled electrically in common to an upper layer through contacts.

For example, as shown in FIG. 8, the word lines WL of the same height or level may be coupled electrically to each other. Accordingly, when a word line WL at a certain height is selected, all NAND strings NS which are coupled electrically to the selected word line WL may be selected. The NAND strings NS in different rows may be coupled electrically to different source select lines SSL. Accordingly, among the NAND strings NS coupled electrically to the same word line WL, by selecting one of the source select lines SSL1 to SSL3, the NAND strings NS in the unselected rows may be electrically isolated from the bit lines BL1 to BL3. In other words, by selecting one of the source select lines SSL1 to SSL3, the NAND strings NS arranged in the same row as the selected source line may be selected. Furthermore, by selecting one of the bit lines BL1 to BL3, the NAND strings NS arranged in the same column as the selected bit line may be selected. Accordingly, only the NAND strings NS arranged in the same row as the selected source line and the same column as the selected bit line may be selected.

In each NAND string NS, a dummy memory cell DMC may be provided. In FIG. 8, for example, the dummy memory cell DMC may be provided between a third memory cell MC3 and a fourth memory cell MC4 in each NAND string NS. For example, first to third memory cells MC1 to MC3 may be provided between the dummy memory cell DMC and the ground select transistor GST. Fourth to sixth memory cells MC4 to MC6 may be provided between the dummy memory cell DMC and the source select transistor SST. The memory cells MC of each NAND string NS may be divided into two (2) memory cell groups by the dummy memory cell DMC. In the divided memory cell groups, memory cells, for example, MC1 to MC3, adjacent to the ground select transistor GST may be referred to as a lower memory cell group, and remaining memory cells, for example, MC4 to MC6, adjacent to the string select transistor SST may be referred to as an upper memory cell group.

Herein below, detailed descriptions will be made with reference to FIGS. 9 to 11, which show a memory device in a memory system, according to an embodiment implemented with a three-dimensional (3D) nonvolatile memory device different from the first structure.

Figure 9:
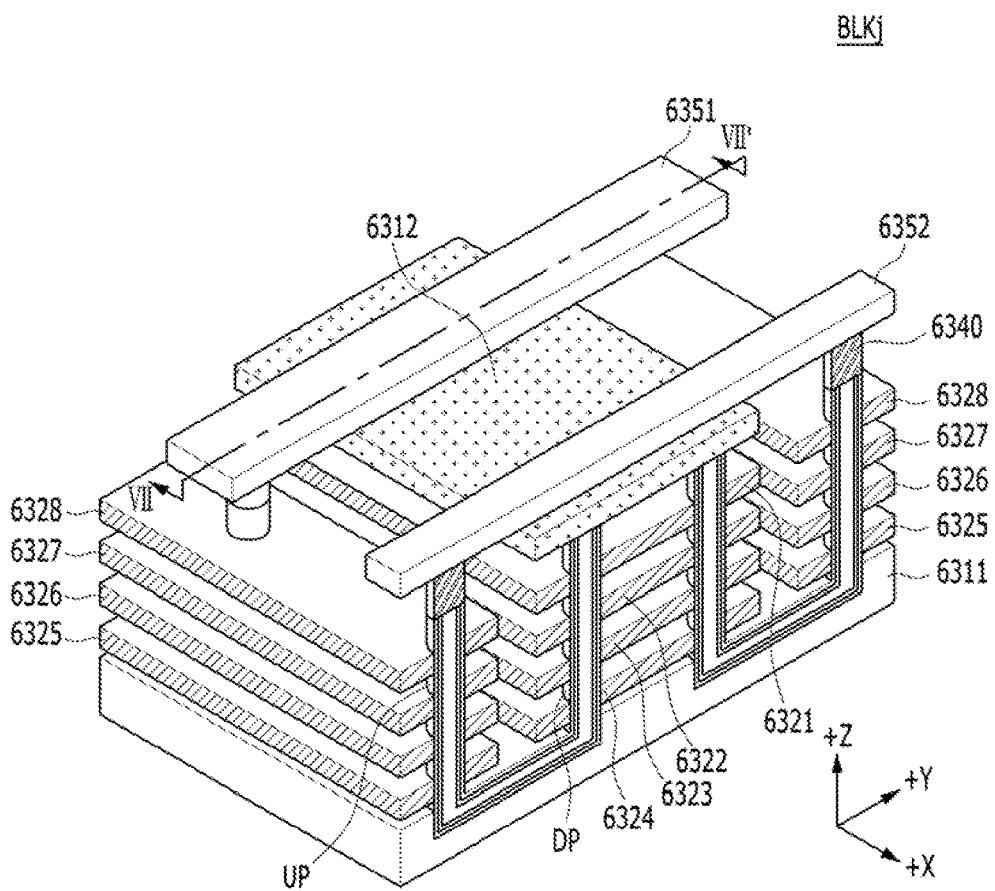

FIG. 9 is a perspective view schematically illustrating a memory device implemented with a three-dimensional (3D) nonvolatile memory device, which is different from the first structure described above with reference to FIGS. 5 to 8 and showing a memory block BLKj of the plurality of memory blocks of FIG. 4. FIG. 10 is a cross-sectional view illustrating the memory block BLKj taken along the line VII-VII' of FIG. 9.

Figure 10:
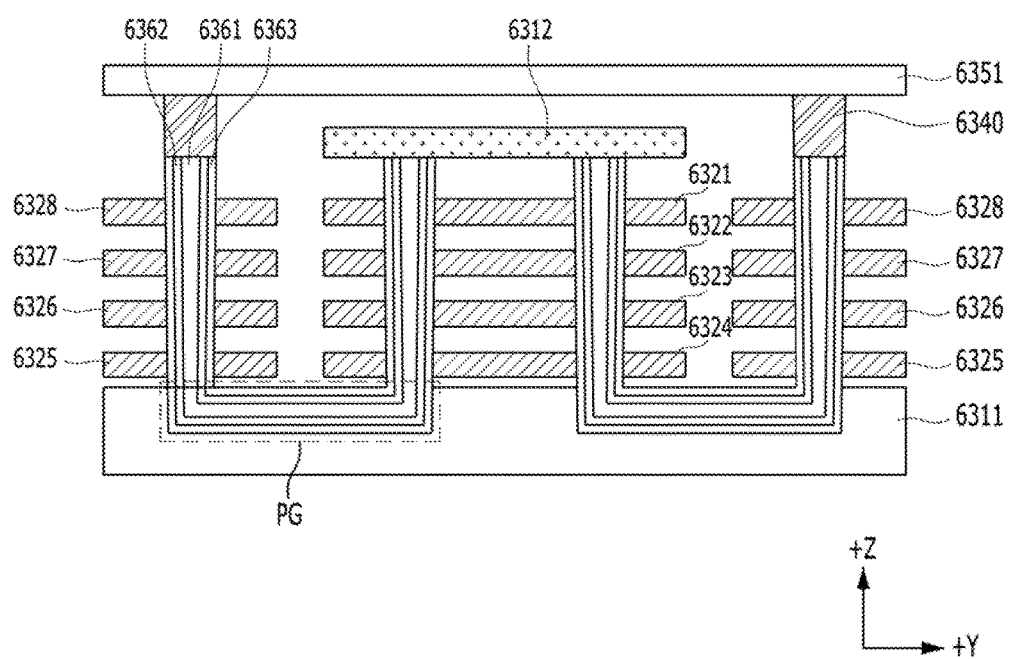

Referring to FIGS. 9 and 10, the memory block BLKj may include structures extending in the first to third directions and may include a substrate 6311. The substrate 6311 may include a silicon material doped with a first type impurity. For example, the substrate 6311 may include a silicon material doped with a p-type impurity. The substrate 6311 may be a p-type well, for example, a pocket p-well. The substrate 6311 may further include an n-type well which surrounds the p-type well. Although, in the described embodiment, the substrate 6311 is exemplified as being the p-type silicon, it is noted that the substrate 6311 is not limited to the p-type silicon.

First to fourth conductive material regions 6321 to 6324 extending in an x-axis direction and a y-axis direction are provided over the substrate 6311. The first to fourth conductive material regions 6321 to 6324 may be separated by a preset distance in the z-axis direction.

Fifth to eighth conductive material regions 6325 to 6328 extending in the x-axis direction and the y-axis direction may be provided over the substrate 6311. The fifth to eighth conductive material regions 6325 to 6328 may be separated by the preset distance in the z-axis direction. The fifth to eighth conductive material regions 6325 to 6328 may be separated from the first to fourth conductive material regions 6321 to 6324 in the y-axis direction.

A plurality of lower pillars DP passing through the first to fourth conductive material regions 6321 to 6324 may be provided. Each lower pillar DP may extend in the z-axis direction. Also, a plurality of upper pillars UP passing through the fifth to eighth conductive material regions 6325 to 6328 may be provided. Each upper pillar UP may extend in the z-axis direction.

Each of the lower pillars DP and the upper pillars UP may include an internal material 6361, an Intermediate layer 6362, and a surface layer 6363. The intermediate layer 6362 may serve as a channel of the cell transistor. The surface layer 6363 may include a blocking dielectric layer, a charge storing layer and a tunneling dielectric layer.

The lower and the upper pillars DP and UP may be coupled electrically with each other through a pipe gate PG. The pipe gate PG may be disposed in the substrate 6311. For example, the pipe gate PG may include the same material as the lower pillar DP and the upper pillar UP.

A doping material 6312 of a second type extending in the x-axis direction and the y-axis direction may be provided over the lower pillars DP. For example, the doping material 6312 of the second type may include an n-type silicon material. The doping material 6312 of the second type may serve as a common source line CSL.

Drains 6340 may be provided over the upper pillars UP. The drains 6340 may include an n-type silicon material. First and second upper conductive material regions 6351 and 6352 extending in the y-axis direction may be provided over the drains 6340.

The first and second upper conductive material regions 6351 and 6352 may be spaced apart along the x-axis direction. The first and second upper conductive material regions 6351 and 6352 may be formed of a metal. The first and second upper conductive material regions 6351 and 6352 and the drains 6340 may be coupled electrically with each other through contact plugs. The first and second upper conductive material regions 6351 and 6352 may serve as first and second bit lines BL1 and BL2, respectively.

The first conductive material 6321 may serve as a source select line SSL. The second conductive material 6322 may serve as a first dummy word line DWL1. The third and fourth conductive material regions 6323 and 6324 may serve as first and second main word lines MWL1 and MWL2, respectively. The fifth and sixth conductive material regions 6325 and 6326 may serve as third and fourth main word lines MWL3 and MWL4, respectively. The seventh conductive material 6327 may serve as a second dummy word line DWL2. The eighth conductive material 6328 may serve as a drain select line DSL.

The lower pillar DP and the first to fourth conductive material regions 6321 to 6324 adjacent to the lower pillar DP may form a lower string. The upper pillar UP and the fifth to eighth conductive material regions 6325 to 6328 adjacent to the upper pillar UP may form an upper string. The lower string and the upper string may be coupled electrically with each other through the pipe gate PG. One end of the lower string may be coupled electrically to the doping material 6312 of the second type which serves as the common source line CSL. One end of the upper string may be coupled electrically to a corresponding bit line through the drain 6340. One lower string and one upper string may form one cell string which is coupled electrically between the doping material 6312 serving as the common source line CSL and a corresponding one of the upper conductive material layers 6351 and 6352 serving as the bit line BL.

For example, the lower string may include a source select transistor SST, the first dummy memory cell DMC1, and the first and second main memory cells MMC1 and MMC2. The upper string may include the third and fourth main memory cells MMC3 and MMC4, the second dummy memory cell DMC2, and a drain select transistor DST.

In FIGS. 9 and 10, the upper string and the lower string may form a NAND string NS. The NAND string NS may include a plurality of transistor structures TS. Since the transistor structure included in the NAND string NS in FIGS. 9 and 10 is described above in detail with reference to FIG. 7, a detailed description thereof will be omitted herein.

Figure 11:
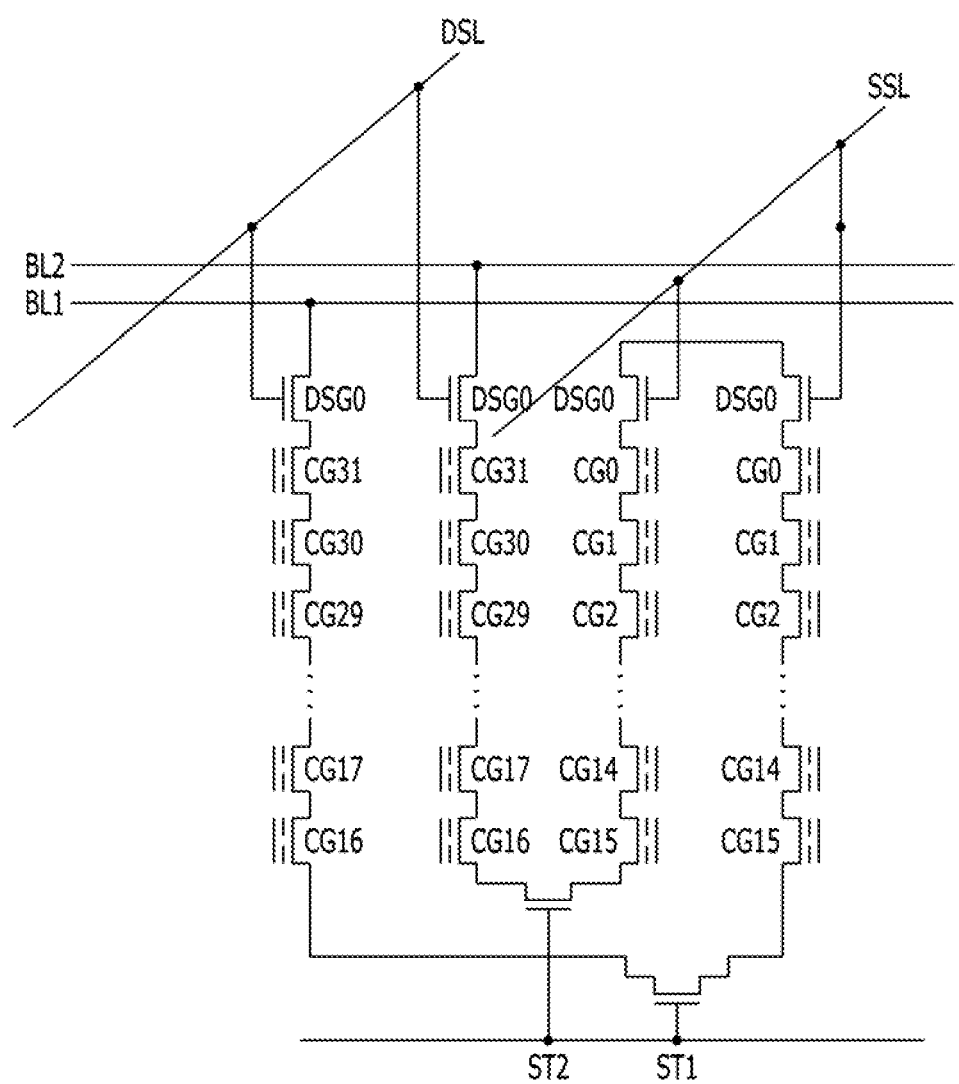

FIG. 11 is a circuit diagram illustrating the equivalent circuit of the memory block BLKj having the second structure as described above with reference to FIGS. 9 and 10. For the sake of convenience, only a first string ST1 and a second string ST2 are shown, forming a pair in the memory block BLKj in the second structure.

Referring to FIG. 11, in the memory block BLKj having the second structure, a plurality of cell strings, each of which is implemented with one upper string and one lower string coupled electrically through the pipe gate PG as described above with reference to FIGS. 9 and 10, may be provided, in such a way as to define a plurality of pairs.

For example, in memory block BLKj having the second structure, memory cells CG0 to CG31 stacked along a first channel CH1 (not shown), for example, at least one source select gate SSG1 and at least one drain select gate DSG1 may form a first string ST1, and memory cells CG0 to CG31 stacked along a second channel CH2 (not shown), for example, at least one source select gate SSG2 and at least one drain select gate DSG2 may form a second string ST2. The first and the second strings ST1 and ST2 may be coupled electrically to the same drain select line DSL and the same source select line SSL. The first string ST1 may be coupled electrically to a first bit line BL1. The second string ST2 may be coupled electrically to a second bit line BL2.

Although FIG. 11 shows the first string ST1 and the second string ST2 are coupled electrically to the same drain select line DSL and the same source select line SSL, it may be envisaged that the first string ST1 and the second string ST2 may be coupled electrically to the same source select line SSL and the same bit line BL, the first string ST1 may be coupled electrically to a first drain select line DSL1 and the second string ST2 may be coupled electrically to a second drain select line DSL2. Further it may be envisaged that the first string ST1 and the second string ST2 may be coupled electrically to the same drain select line DSL and the same bit line BL, the first string ST1 may be coupled electrically to a first source select line SSL1 and the second string ST2 may be coupled electrically a second source select line SSL2.

Hereinafter, a data processing operation to a memory device in a memory system in embodiment, for example, a command data processing operation to the memory device 150 of FIG. 1 in response to a command received form the host 102 of FIG. 1 will be described in more detail with reference to FIG. 12 to FIG. 16.

FIG. 12 to FIG. 15 are diagrams for schematically explaining a data processing operation to a memory device in a memory system according to an embodiment of the invention. Hereafter, it is described as an example that the memory system 110 of FIG. 1 performs a command operation corresponding to a command received from the host 102 of FIG. 1. The command operation may include read and write operations, and the memory system 110 may read/write command data corresponding to the command, for example, read and write data corresponding to read and write commands, from/to a plurality of memory blocks included in the memory device 150 of FIG. 1. When performing the command operation, the memory system 110 may store the command data temporarily in a buffer/cache included in the memory 144 of the controller 130 of FIG. 1 and confirm map data for the command data through a search/scan operation.

Furthermore, hereinafter, for simple description, it will be described as an example that the controller 130 performs a data processing operation in the memory system 110. However, the processor 134 included in the controller 130 may also perform the data processing operation through a FTL, for example. The processor 134 may confirm map data corresponding to a command operation, update the map data according to the command operation, and store the updated map data in a memory block of the memory device 150 when the controller 130 performs the command operation corresponding to a command received from the host 102. The processor 134 may search the map data stored in the memory block of the memory device 150, whenever the controller 130 performs the command operation in response to the command received from the host 102. The map data may include first map data including logical to physical (L2P) address information (hereinafter, referred to as "logical information") and second map data including physical to logical (P2L) address information (hereinafter, referred to as "physical information")

In an embodiment, when the controller 130 receives a write command from the host 102, the processor 134 writes (stores) user data corresponding to the write command in an open block or free block among the memory blocks (i.e., user data block) of the memory device 150, and stores first and second map data corresponding to the user data in an open block or free block among the memory blocks (i.e., map block) of the memory blocks. The first map data may include an L2P map table with logical information, that is, mapping information linking logical addresses to physical addresses for the user data stored in the user data blocks, and the second map data may include a P2L map table with physical information, that is, the mapping information linking physical addresses and logical addresses for the user data blocks having the user data stored therein. Furthermore, when the controller 130 receives a read command from the host 102, the processor 134 searches (that is, scans) for map data of user data corresponding to the read command, for example, between the first map data and the second map data stored in the map blocks of the memory blocks, confirms user data blocks with the user data from the memory blocks, reads the user data stored in the user data blocks, and then provides the user data to the host 102.

Particularly, in an embodiment, when a command operation in memory blocks is performed for user data corresponding to a command received from the host 102, search and confirmation operations between the first map data and the second map data for the user data stored in the memory blocks are performed for the command operation. In other words, logical segments of the first map data for the user data, for example, L2P segments, and physical segments including physical information of the second map data, for example, P2L segments, are searched and confirmed (that is, scanned), so that the command operation for the user data in the memory blocks is performed.

In this case, in order to quickly and stably scan the logical segments and the physical segments in the first map data and the second map data, respectively, the first and second map data may be generated by sorting the respective logical segments and the physical segments based on logical information of the user data, for example, logical page numbers (LPN) or logical addresses. The first map data and the second map data may be stored in one or more memory blocks of the memory device 150. When scanning between the first map data and the second map data in order to perform a command operation corresponding to a command received from the host 102, the first map data and the second map data are loaded in a map cache or a map buffer included in the memory 144 of the controller 130, and then search and confirmation operations for the sorted logical and physical segments of the first and second map data may be performed more quickly.

In an embodiment, when the controller 130 generates map data, particularly second map data during a write command operation corresponding to a write command received from the host 102, the controller 130 may confirm logical addresses or LPNs of user data, which correspond to the write command to be written in pages of the memory blocks. P2L segments are generated and sorted based on the LPNs to configure a P2L map table of the second map data, that is, to generate the second map data. The second map data may be stored in the memory blocks of the memory device 150 and may be loaded and managed in the map cache or the map buffer included in the memory 144 of the controller 130.

Furthermore, when the controller 130 updates the second map data stored in the memory 144 during the write command operation, the controller 130 may confirm the LPNs of the user data and positions corresponding to the LPNs of the user data in the sorted P2L segments of the second map data. The controller 130 may shift P2L segments at the confirmed positions and recode P2L segments corresponding to the user data on the confirmed positions which become empty areas through the shift. P2L segments of the updated second map data may be also sorted based on the LPNs.

Accordingly, in order to perform a command operation corresponding to a command received from the host 102, search and confirmation operations for LPNs of command data corresponding to the command may be quickly performed since the logical segments and the physical segments of the first map data and the second map data are sorted based on the LPNs of user data. That is, scanning in the first map data and the second map data for the LPNs of the command data corresponding to the command may be quickly performed.

As described above, as the P2L segments of the second map data loaded in the memory 144 of the controller 130 are sorted based on the LPNs of the user data, scanning for P2L segments corresponding to command data corresponding to a command received from the host 102 is quickly performed, so that it is possible to quickly perform search and confirmation operations of the first and second map data in order to perform a command operation corresponding to the command. The access rate to the first and second map data for performing the command operation may be increased, thereby quickly and stably processing the command data. Hereinafter, a data processing operation in the memory system will be described in more detail with reference to FIGS. 12 to 15.

Figure 12:
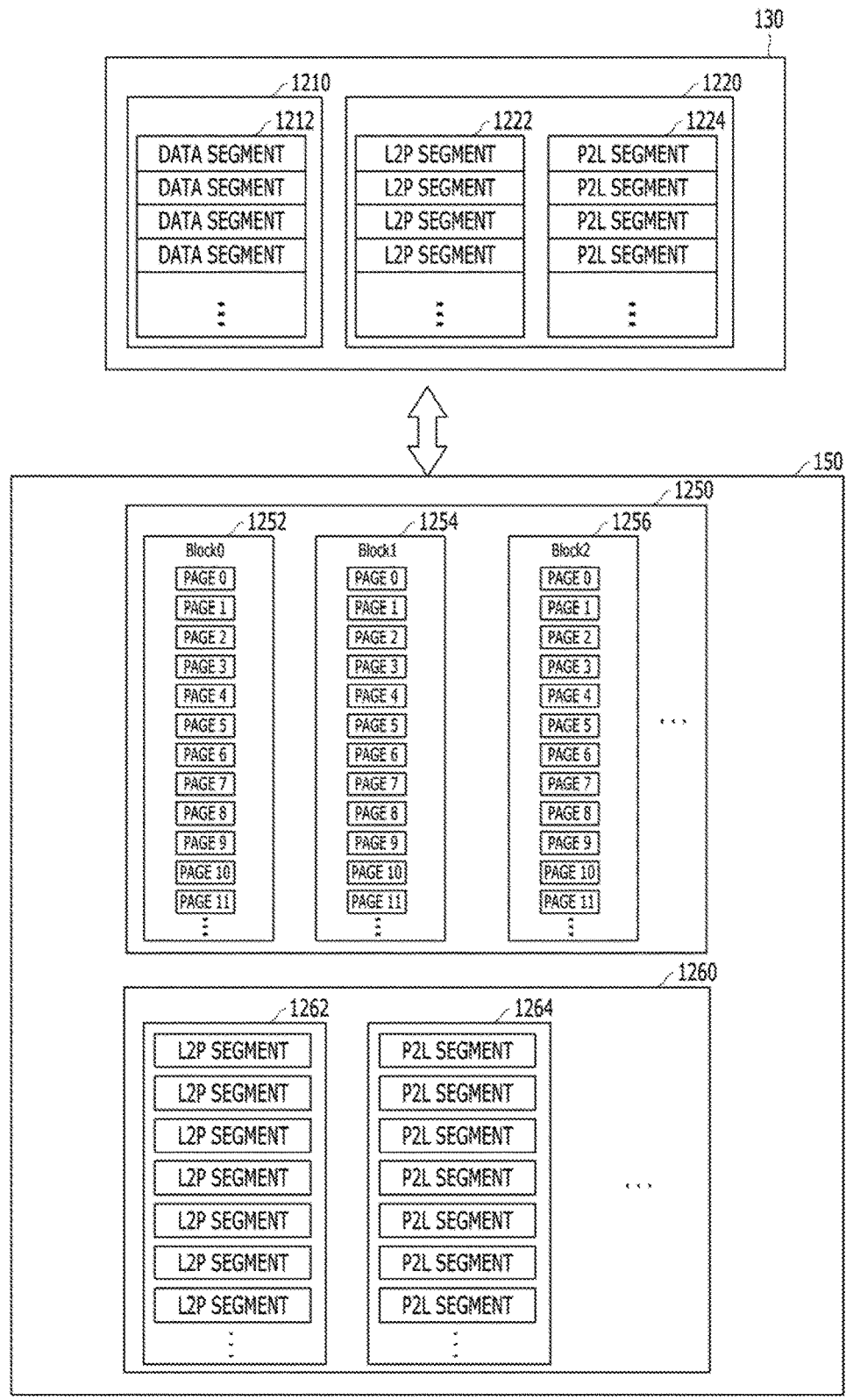
FIG. 12 to FIG. 15 are diagrams schematically illustrating a data processing operation to a memory device in a memory system according to an embodiment of the present invention.

Referring to FIG. 12, the controller 130 writes and stores user data corresponding to a write command received form the host 102, in open blocks of a data memory block 1250 among the memory blocks of the memory device 150, and generates and stores map data for the user data in open blocks of a map memory block 1260 among the memory blocks of the memory device 150 in correspondence to a write operation to the data memory block 1250.

The controller 130 stores information, which indicates that the user data has been stored in pages (PAGE0 to PAGE11) of first to third data blocks (BLOCK0 to BLOCK2) 1252, 1254, and 1256 of the memory device 150 in first and second map blocks 1262 and 1264 of the memory device 150. In other words, the controller 130 stores logical segments of the first map data, that is, L2P segments in the first map block 1262 and stores physical segments of the second map data, that is, P2L segments in the second map block 1264

Furthermore, the controller may cache and buffer the user data before storing the user data in the memory device 150. The controller 130 caches and buffers the user data in a first buffer 1210 included in the memory 144 of the controller 130, that is, stores data segments 1212 of the user data in the first buffer 1210 serving as a data buffer/cache, and then writes and stores the data segments 1212 stored in the first buffer 1210 in the pages of the first to third data blocks 1252, 1254, and 1256 of the memory device 150.

As the data segments 1212 of the user data are written and stored in the pages of the first to third data blocks 1252, 1254, and 1256 of the memory device 150, the controller 130 generates the first map data and the second map data, and stores the first map data and the second map data in a second buffer 1220 included in the memory 144 of the controller 130. The controller 130 stores L2P segments 1222 of the first map data for the user data and P2L segments 1224 of the second map data in the second buffer 1220 serving as a map buffer/cache.

In the memory 144 of the controller 130, in the second buffer 1220, the L2P segments 1222 of the first map data and the P2L segments 1224 of the second map data may be stored or a map list for the L2P segments 1222 of the first map data and a map list for the P2L segments 1224 of the second map data may be stored. In this case, the L2P segments 1222 of the first map data and the P2L segments 1224 of the second map data are sorted in an LPN order and are stored in the second buffer 1220 or indexes indicating map segments in the map lists are sorted in an LPN order and are stored in the second buffer 1220. Hereinafter, as an example, it will be described that the L2P segments 1222 of the first map data and the P2L segments 1224 of the second map data are sorted in an LPN order and are stored in the second buffer 1220; however, various other embodiments may also be applied in substantially the same manner.

Furthermore, the controller 130 stores the L2P segments 1222 of the first map data and the P2L segments 1224 of the second map data, which have been stored in the second buffer 1220, in the first map block 1262 and the second map block 1264 of the memory device 150, respectively. In addition, when performing scanning in the first map data and the second map data for user data corresponding to a command received form the host 102 in order to perform a command operation corresponding to the command, the controller 130 performs scanning in the L2P segments 1222 of the first map data and the P2L segments 1224 of the second map data stored in the second buffer 1220, or loads the L2P segments of the first map data and the P2L segments of the second map data, which have been stored in the first map block 1262 and the second map block 1264 of the memory device 150, to the second buffer 1220 and then performs scanning in the L2P segments 1222 of the first map data and the P2L segments 1224 of the second map data loaded to the second buffer 1220. Hereinafter, as an example, it will be described that the data segments 1212 of the user data are written and stored in the first data block 1252 of the memory device 150.

Figure 13:
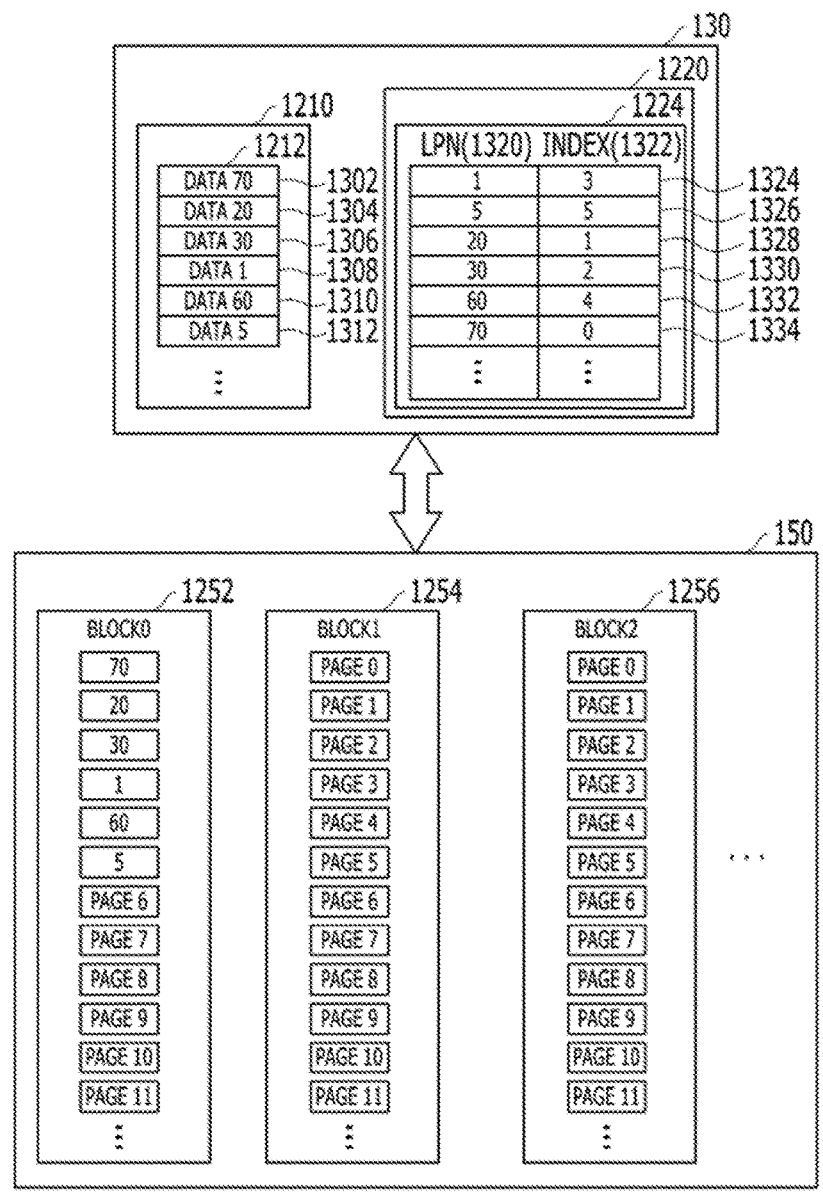

Referring to FIG. 13, when a write command is received from the host 102, the controller 130 stores the data segments 1212 of the user data corresponding to the write command in the first buffer 1210 included in the memory 144 of the controller 130. For example, the controller 130 stores, in the first buffer 1210, a data segment 1302 (hereinafter, referred to as a "data 70") having a logical page number 70, a data segment 1304 (hereinafter, referred to as a "data 20") having a logical page number 20, a data segment 1306 (hereinafter, referred to as a "data 30") having a logical page number 30, a data segment 1308 (hereinafter, referred to as a "data 1") having a logical page number 1, a data segment 1310 (hereinafter, referred to as a "data 60") having a logical page number 60, and a data segment 1312 (hereinafter, referred to as a "data 5") having a logical page number 5.

Then, the controller 130 writes and stores the data segments 1212 of the user data stored in the first buffer 1210 in pages included in the first data block 1252 of the memory device 150. In detail, among the data segments 1212 of the user data stored in the first buffer 1210, the controller 130 stores the data 70, the data 20, the data30, the data 1, the data 60, and the data 5 in first to sixth pages (PAGE0 to PAGE5) of the first data block 1252, respectively.

Furthermore, the controller 130 generates information indicating that the data segments 1212 of the user data have been written and stored in the pages included in the first data block 1252 of the memory device 150, that is, the P2L segments 1224 of the second map data, sorts the P2L segments 1224 of the second map data based on the LPNs of the user data, and then stores the sorted P2L segments 1224 in the second buffer 1220.

The controller 130 generates the P2L segments 1224 of the second map data by recording LPNs 1320 of the user data and indexes 1322 indicating physical addresses for the LPNs 1320 of the user date in a P2L map table of the second map data. In more detail, the controller 130 generates a P2L segment 1334 (hereinafter, referred to as a "P2L segment 70") indicating that the data 70 has been stored in the first page (PAGE0) of the first data block 1252, a P2L segment 1328 (hereinafter, referred to as a "P2L segment 20") indicating that the data 20 has been stored in the second page (PAGE1) of the first data block 1252, a P2L segment 1330 (hereinafter, referred to as a "P2L segment 30") indicating that the data 30 has been stored in the third page (PAGE2) of the first data block 1252, a P2L segment 1324 (hereinafter, referred to as a "P2L segment 1") indicating that the data 1 has been stored in the fourth page (PAGE3) of the first data block 1252, a P2L segment 1332 (hereinafter, referred to as a "P2L segment 60") indicating that the data 60 has been stored in the fifth page (PAGE4) of the first data block 1252, and a P2L segment 1326 (hereinafter, referred to as a "P2L segment 5") indicating that the data 5 has been stored in the sixth page (PAGE5) of the first data block 1252. That is, the controller 130 generates the P2L segments 1224 of the second map data, which indicate that the data segments 1212 of the user data have been written and stored in the pages included in the first data block 1252 of the memory device 150, for example, generates the P2L segment 70 (1334), the P2L segment 20 (1328), the P2L segment 30 (1330), the P2L segment 1 (1324), the P2L segment 60 (1332), and the P2L segment 5 (1326).

Then, the controller 130 generates and stores the second data by sorting the generated P2L segments 1224 thereof based on the LPNs of the user data. In order words, the P2L segment 1 (1324), the P2L segment 5 (1326), the P2L segment 20 (1328), the P2L segment 30 (1330), the P2L segment 60 (1332), and the P2L segment 70 (1334) are sorted in an LPN order in the P2L map table of the second map data, and the second map data, in which the P2L segments 1224 have been sorted, is managed by and stored in the second buffer 1220 and is stored in the second map block 1264 of the memory device 150. Hereinafter, it will be described in more detail that the second data are updated when the data segments 1212 of the user data corresponding to the write command received from the host 102 are written and stored in the first data block 1252 of the memory device 150.

Figure 14:
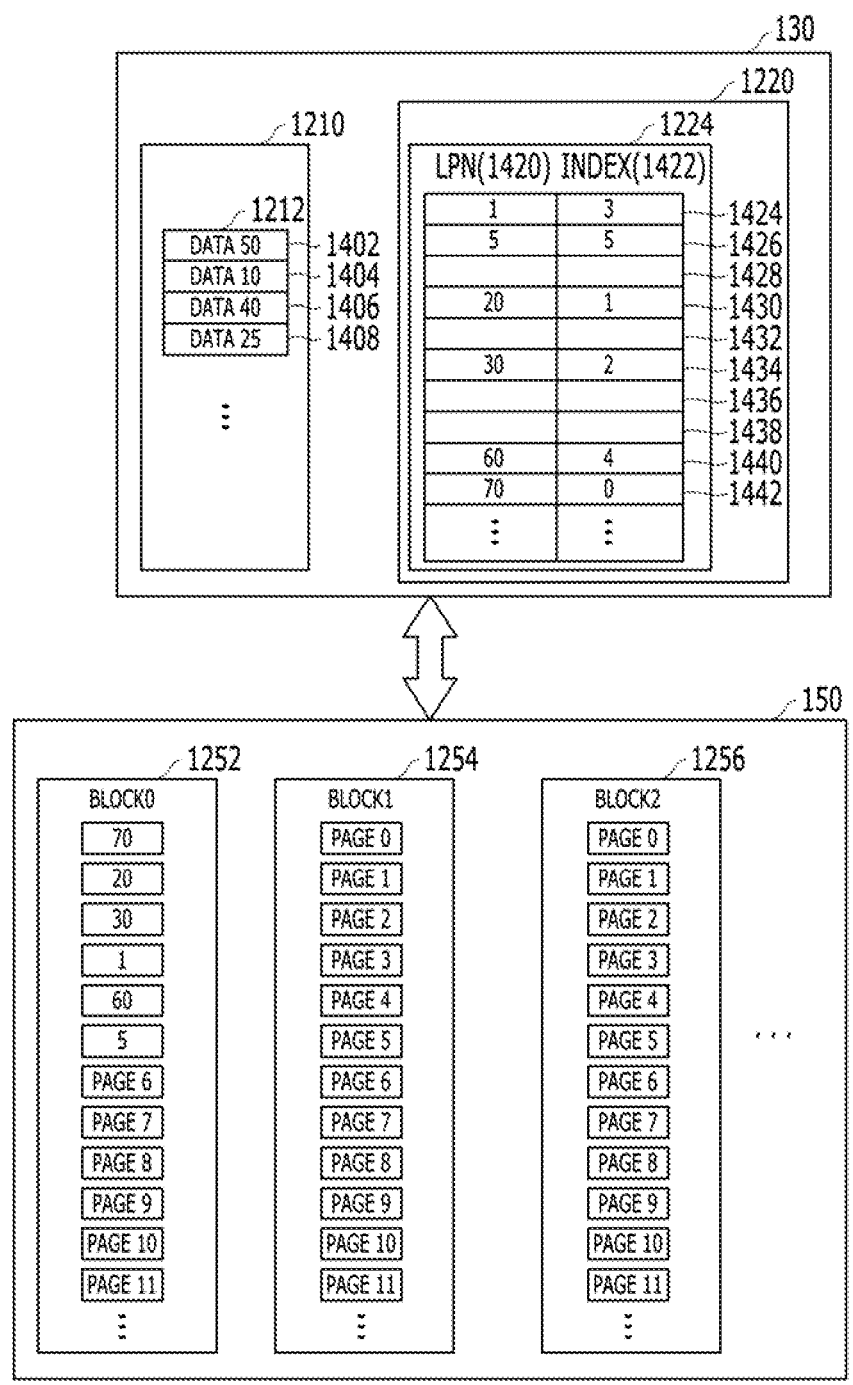
Figure 15:
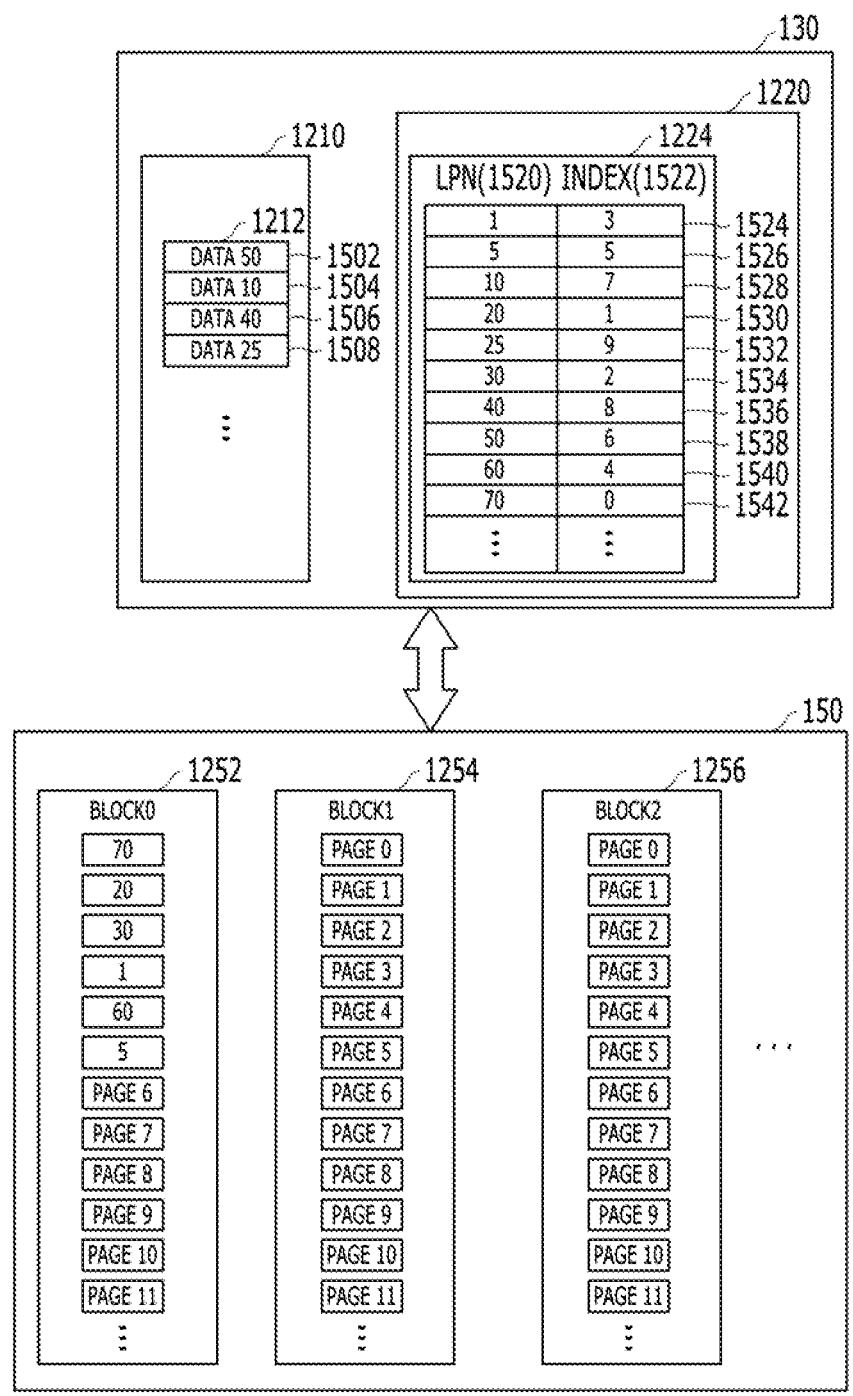

Referring to FIGS. 14 and 15, as described above, the controller 130 stores the data 70, the data 20, the data 30, the data 1, the data 60, and the data 5 in the first to sixth pages (PAGE0 to PAGE5) of the first data block 1252, and stores the second map data, in which the P2L segment 1 (1324), the P2L segment 5 (1326), the P2L segment 20 (1328), the P2L segment 30 (1330), the P2L segment 60 (1332), and the P2L segment 70 (1334) have been sorted based on the LPNs, in the second buffer 1220.

Then, when a write command is received from the host 102, the controller 130 stores, in the first buffer 1210, the data segments 1212 of user data corresponding to the write command, for example, a data segment 1402 (hereinafter, referred to as a "data 50") having a logical page number 50, a data segment 1404 (hereinafter, referred to as a "data 10") having a logical page number 10, a data segment 1406 (hereinafter, referred to as a "data 40") having a logical page number 40, and a data segment 1408 (hereinafter, referred to as a "data 25") having a logical page number 25.

Furthermore, the controller 130 confirms the LPNs of the data segments 1212 of the user data stored in the first buffer 1210, for example, the data 50 (1402), the data 10 (1404), the data 40 (1406), and the data 25 (1408), in order to update the second map data for the data segments 1212 corresponding to the storage of the data segments 1212. Furthermore, the controller 130 confirms the positions the LPNs of the data 50 (1402), the data 10 (1404), the data 40 (1406), and the data 25 (1408) in the P2L segments of the second map data stored in the second buffer 1220.

In other words, as described above, the controller 130 confirms positions, to which the LPNs of the data 50 (1402), the data 10 (1404), the data 40 (1406), and the data 25 (1408) stored in the first buffer 1210 correspond, in the P2L segments 1224 of the second map data. In this case, since indexes 1422 indicating physical addresses for LPNs 1420 have been recorded in the P2L map table of the second map data and the P2L segments 1224 have been sorted based on the LPNs 1420, the controller 130 may quickly scan, that is, confirm the positions to which the LPNs of the data 50 (1402), the data 10 (1404), the data 40 (1406), and the data 25 (1408) stored in the first buffer 1210 correspond.

For example, in the P2L map table of the second map data including the P2L segments 1224 stored in the second buffer 1220 of FIG. 13, the controller 130 confirms that a position corresponding to the LPN of the data 50 (1402) is between the P2L segment 30 (1330) and the P2L segment 60 (1332), confirms that a position corresponding to the LPN of the data 10 (1404) is between the P2L segment 5 (1326) and the P2L segment 20 (1328), confirms that a position corresponding to the LPN of the data 40 (1406) is between the P2L segment 30 (1330) and the P2L segment 60 (1332), and confirms that a position corresponding to the LPN of the data 25 (1408) is between the P2L segment 20 (1328) and the P2L segment 30 (1330).

Then, the controller 130 shifts P2L segments existing in the positions to which the LPNs of the data 50 (1402), the data 10 (1404), the data 40 (1406), and the data 25 (1408) stored in the first buffer 1210 correspond, that is, shifts the P2L segment 20 (1328), the P2L segment 30 (1330), and the P2L segment 60 (1332) in the P2L map table of the second map data including the P2L segments 1224 stored in the second buffer 1220 of FIG. 13.

That is, as illustrated in FIG. 14, the controller 130 shifts a P2L segment 20 (1430), a P2L segment 30 (1434), and a P2L segment 60 (1440) in the P2L map table of the second map data including the P2L segments 1224 stored in the second buffer 1220, thereby generating respective empty areas 1428, 1432, 1436, and 1438 for accommodating the LPNs of the data 50 (1402), the data 10 (1404), the data 40 (1406), and the data 25 (1408) stored in the first buffer 1210.

Then, as illustrated in FIG. 15, the controller 130 writes and stores the data segments 1212 of the user data stored in the first buffer 1210 in pages included in the first data block 1252 of the memory device 150. In this case, in the data segments 1212 of the user data stored in the first buffer 1210, the controller 130 stores the data 50 (1502), data 10 (1504), data 40 (1506), and data 25 (1508) in seventh to tenth pages (PAGE6 to PAGE9) of the first data block 1252, respectively.

Furthermore, the controller 130 generates information, which indicates the data segments 1212 of the user data have been written and stored in the pages included in the first data block 1252 of the memory device 150, that is, the P2L segments 1224 of the second map data, sorts the P2L segments 1224 of the second map data based on the LPNs as described above, and then stores the sorted P2L segments 1224 in the second buffer 1220.

In more detail, the controller 130 generates a P2L segment 1538 (hereinafter, referred to as a "P2L segment 50"), which indicates that the data 50 has been stored in the seventh page (PAGE6) of the first data block 1252, a P2L segment 1528 (hereinafter, referred to as a "P2L segment 10"), which indicates that the data 10 has been stored in the eighth page (PAGE7) of the first block 1252, a P2L segment 1536 (hereinafter, referred to as a "P2L segment 40"), which indicate that the data 40 has been stored in the ninth page (PAGE8) of the first data block 1252, and a P2L segment 1532 (hereinafter, referred to as a "P2L segment 25"), which indicates that the data 25 has been stored in the tenth page (PAGE9) of the first data block 1252, in the P2L map table of the second map data in which indexes 1522 indicating physical addresses for LPNs 1520 have been recorded. That is, the controller 130 generates the P2L segments 1224 of the second map data, which indicates that the data segments 1212 of the user data have been written and stored in the pages included in the first data block 1252 of the memory device 150, for example, the P2L segment 50 (1538), the P2L segment 10 (1528), the P2L segment 40 (1536), and the P2L segment 25 (1532).

Then, the controller 130 generates and stores the second data by sorting the generated P2L segments 1224 thereof based on the LPNs. In order words, the P2L segment 50 (1538), the P2L segment 10 (1528), the P2L segment 40 (1536), and the P2L segment 25 (1532) are recorded in the empty areas 1428, 1432, 1436, and 1438 generated through the shift of the P2L segments 1224 sorted based on the LPN as described above in the P2L map table of the second map data. That is, the controller 130 records the P2L segment 10 (1528) in the first empty area 1428, records the P2L segment 25 (1532) in the second empty area 1432, records the P2L segment 40 (1536) in the third empty area 1436, and records the P2L segment 50 (1538) in the fourth empty area 1438, thereby generating the second map data.

Accordingly, in the P2L map table of the second map data, in which the index 1522 indicating the physical address for the LPN 1520 stored in the second buffer 1220 has been recorded, the controller 130 generates the second map data by sorting the P2L segment 1 (1524), the P2L segment 5 (1526), the P2L segment 10 (1528), the P2L segment 20 (1530), the P2L segment 25 (1532), the P2L segment 30 (1534), the P2L segment 40 (1536), the P2L segment 50 (1538), the P2L segment 60 (1540), and the P2L segment 70 (1542) in an LPN order, and the second map data, in which the P2L segments 1224 have been sorted, is managed by and stored in the second buffer 1220 and is also stored in the second map block 1264 included of the memory device 150.

As described above, in the memory system in an embodiment, map data for user data, for example, P2L segments of second map data are sorted based on an LPN order of the user data, and are stored in and managed by the map cache included in the memory 144 of the controller 130, for example, the second buffer 1220 and the memory blocks of the memory device 150. Accordingly, when searching for map data for command data corresponding to a command received from the host 102 in the P2L segments of the second map data in order to perform a command operation corresponding to the command, it is possible to quickly perform scanning in the P2L segments of the second map data. Consequently, the command data may be quickly processed, so that it is possible to quickly perform the command operation. Hereinafter, a data processing operation of a memory system in an embodiment will be described with reference to FIG. 16 in more detail.

Figure 16:
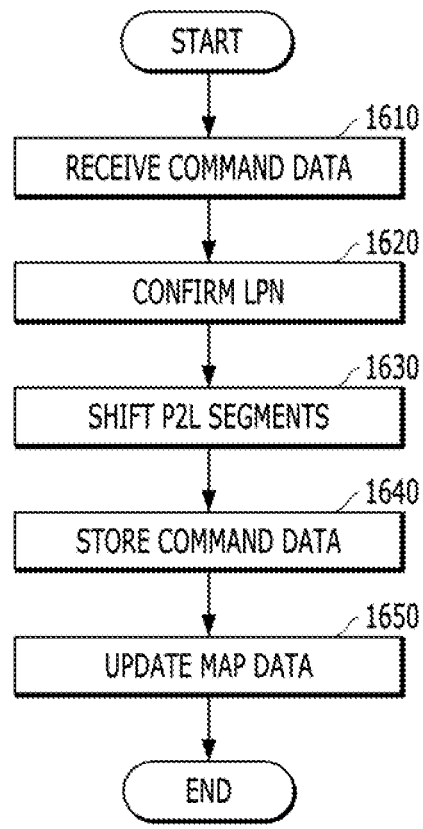
FIG. 16 is a flowchart illustrating an operating process of a memory system, according to an embodiment of the present invention.

FIG. 16 is a diagram schematically illustrating an operating process of processing data in a memory system, according to an embodiment of the invention.

Referring to FIG. 16, in step 1610, the memory system receives command data corresponding to a command received from the host.

In step 1620, the memory system confirms logical information for the command data corresponding to the command received from the host, for example, an LPN.

In step 1630, when a command operation corresponding to the command received from the host is performed, the memory system confirms map data for the command data, for example, a position corresponding to the LPN of the command data in P2L segments of second map data in order to update the map data of the command data corresponding to the command operation, and then shifts the P2L segments of the second map data in order to generate the position which corresponds to the LPN of the command data in the P2L segments of the second map data, in an empty area.

In step 1640, the memory system performs the command operation corresponding to the command received from the host, for example, stores command data corresponding to a write command received from the host in memory blocks of a memory device.

In step 1650, the memory system updates the map data, for example, the P2L segments of the second map data in correspondence to the command operation, for example, the storage of the command data. The memory system sorts, updates, and stores the P2L segments of the second map data in an LPN order.

Since the confirmation of the map data of the command data corresponding to the command received from the host, and the generating and updating of the map data of the user data through the sorting of map segments included in the map data in the LPN order have been described with reference to FIG. 12 to FIG. 15 in more detail, a description thereof will be omitted.

In the memory system and the operating method thereof in accordance with embodiments as described above, it is possible to minimize the performance deterioration of the memory system while simplifying the operation of the memory system and quickly and stably process data to the memory device of the memory system.

Although various embodiments have been described for illustrative purposes, it will be apparent to those skilled in the art that various changes and modifications may be made without departing from the spirit and/or scope of the invention as defined in the following claims.

What is claimed is:

1. A memory system comprising:
a memory device including a plurality of memory blocks each memory block including a plurality of pages; and
a controller suitable for storing data in a first memory block of the memory blocks, generating map data for the stored data in the first memory block by sorting map segments of the map data based on logical information of the data, and storing the map data in a second memory block of the memory blocks, wherein the controller loads the map data from the second memory block to a memory of the controller, and scans the sorted map segments of the map data for a first map segment of first data corresponding to a command received from a host, and wherein the controller confirms a position of the first map segment through the scanning based on logical information of the first data in the sorted map segments of the map data, and shifts a second map segment existing in the confirmed position, thereby generating an empty area in the map data.

2. The memory system of claim 1, wherein the controller stores the first data in the first memory block, and records the first map segment corresponding to storage of the first data to the first memory block in the empty area, thereby updating the map data.

3. The memory system of claim 2, wherein the controller stores the updated map data in the memory and the second memory block.

4. The memory system of claim 1, wherein the controller confirms the first map segment through the scanning based on logical information of the first data in the sorted map segments of the map data, reads the first data stored in the first memory block through the first map segment confirmed in the map data, and provides the read first data to the host.

5. The memory system of claim 1, wherein the controller sorts indexes indicating the storage of the data to the first memory block based on the logical information of the data in a map list for the map segments, and stores the sorted indexes in a memory of the controller.

6. The memory system of claim 1, wherein the logical information of the data includes a logical page number (LPN) of the data stored in the first memory block.

7. The memory system of claim 1, wherein the map segments include physical to logical (P2L) segments for the data in correspondence to the storage of the data to the first memory block.

8. The memory system of claim 1, wherein the controller sorts indexes indicating the storage of the data to the first memory block in an order of a logical page number (LPN) of the data in a physical to logical (P2L) table for the data.

9. An operating method of a memory system comparing a plurality of memory blocks each having a plurality of pages, comprising:
storing data in a first memory block of the memory blocks;
generating map data corresponding to the data stored in the first memory block by sorting map segments of the map data based on logical information of the data;
storing the map data in a second memory block of the memory blocks;
loading the map data from the second memory block to a memory of the controller;
scanning the sorted map segments of the map data for a first map segment of first data corresponding to a command received from a host;
confirming a position of the first map segment through the scanning based on logical information of the first data in the map segments of the map data; and
shifting a second map segment existing in the confirmed position, thereby generating an empty area in the map data.

10. The operating method of the memory system of claim 9, wherein the scanning of the map data further comprises:
storing the first data in the first memory block; and
recording the first map segment corresponding to storage of the first data to the first memory block in the empty area, thereby updating the map data.

11. The operating method of the memory system of claim 10, wherein the updating of the map data comprises:
storing the updated map data in the memory and the second memory block.

12. The operating method of the memory system of claim 9, wherein the scanning of the map data further comprises:
confirming the first map segment through the scanning based on logical information of the first data in the sorted map segments of the map data; and
reading the first data stored in the first memory block through the first map segment confirmed in the map data and providing the read first data to the host.

13. The operating method of the memory system of claim 9, wherein the generating of the map data comprises:
sorting indexes indicating the storage of the data to the first memory block based on the logical information of the data in a map list for the map segments; and
storing the sorted indexes in a memory of the controller.

14. The operating method of the memory system of claim 9, wherein the logical information of the data includes a logical page number (LPN) of the data stored in the first memory block.

15. The operating method of the memory system of claim 9, wherein the map segments include physical to logical (P2L) segments for the data in correspondence to the storage of the data to the first memory block.

16. The operating method of the memory system of claim 9, wherein the generating of the map data comprises:
sorting indexes indicating the storage of data to the first memory block in an order of a logical page number (LPN) of the data in a physical to logical (P2L) table for the data.

* * * * *